United States Patent [19]
Platt et al.

[11] Patent Number: 5,812,698
[45] Date of Patent: Sep. 22, 1998

[54] HANDWRITING RECOGNITION SYSTEM AND METHOD

[75] Inventors: John C. Platt, Mountain View; Steven Nowlan, San Jose; Joseph Decker, San Jose; Nada Matic, San Jose, all of Calif.

[73] Assignee: Synaptics, Inc., San Jose, Calif.

[21] Appl. No.: 891,937

[22] Filed: Jul. 14, 1997

Related U.S. Application Data

[63] Continuation of Ser. No. 440,559, May 12, 1995, abandoned.

[51] Int. Cl.$^6$ ............................................. G06K 9/00
[52] U.S. Cl. ................................. 382/186; 382/228
[58] Field of Search ............................. 382/155, 156, 382/157, 158, 159, 160, 161, 170, 181, 182, 185, 186, 187, 188, 189, 190, 191, 192, 193, 194, 195, 196, 197, 198, 199, 200, 201, 202, 203, 204, 205, 209, 217, 224, 225, 226, 227, 228, 229, 230, 231, 312, 313, 314, 315; 395/3, 10, 11, 12, 13, 20, 21, 22, 23, 50, 60, 61

[56] References Cited

U.S. PATENT DOCUMENTS

| | | | |
|---|---|---|---|
| 4,949,388 | 8/1990 | Bhaskaran | 382/10 |
| 5,105,468 | 4/1992 | Guyon et al. | 382/14 |
| 5,161,203 | 11/1992 | Buckley | 382/15 |
| 5,231,698 | 7/1993 | Forcier | 395/146 |
| 5,251,268 | 10/1993 | Colley et al. | 382/14 |
| 5,267,327 | 11/1993 | Hirayama | 382/13 |
| 5,337,372 | 8/1994 | LeCun et al. | 382/27 |

OTHER PUBLICATIONS

Bengio, et al., "Globally Trained Handwritten Word Recognition using Spatial Representation, Convolutional Neural Networks and Hidden Markov Models", *Globally Trained Handwritten Word Recognizer*, pp. 937–944.

Guyon, et al., "Design of a Neural Network Character Recognizer fort a Touch Terminal", *Pattern Recognition*, 1991, vol. 24, No. 2, pp. 105–119.

Tappert, et al., "On–Line Handwriting Recognition—A Survey", IEEE, 1988, pp. 1123–1132 (No place of Publication).

Tappert, et al., "The State of the Art in On–Line Handwriting Recognition", IEEE Transactions of Pattern Analysis and Machine Intelligence, vol. 12, No. 8, Aug. 1990, pp. 787–808.

*Primary Examiner*—Leo H. Boudreau
*Assistant Examiner*—Bijan Tadayon
*Attorney, Agent, or Firm*—D'Alessandro & Ritchie

[57] ABSTRACT

A system for recognizing handwritten characters, including pre-processing apparatus for generating a set of features for each handwritten character, a neural network disposed for operating on sparse data structures of those features and generating a set of confidence values for each possible character symbol which might correspond to the handwritten character, and post-processing apparatus for adjusting those confidence values and for selecting a character symbol consistent with external knowledge about handwritten characters and the language they are written in. The pre-processing apparatus scales and re-parameterizes the handwritten strokes, encodes the scaled and re-parameterizd strokes into fuzzy membership vectors and binary pointwise data, and combines the vectors and data into a sparse data structure of features. The (nonconvolutional) neural network performs a matrix-vector multiply on the sparse data structure, using only the data for nonzero features collected in that structure, and, for a first layer of that neural network, using only successive chunks of the neural weights. The post-processing apparatus adjusts the confidence values for character symbols using a set of expert rules embodying common-sense knowledge, from which it generates a set of character probabilities for each character position; these character probabilities are combined with a Markov model of character sequence transitions and a dictionary of known words, to produce a final work output for a sequence of handwritten characters.

63 Claims, 17 Drawing Sheets

HANDWRITING RECOGNITION SYSTEM AND METHOD

CROSS REFERENCE TO RELATED APPLICATION

This is a file-wrapper continuation of patent application Ser. No. 08/440,559, filed May 12, 1995, now abandoned.

BACKGROUND OF THE INVENTION

1. Field of the Invention

The present invention relates to digital systems. More particularly, the present invention relates to a handwriting recognition system capable of adaptive learning.

2. The Prior Art

A handwritten character consists of a set of strokes. The problem of handwriting recognition comprises analyzing the strokes and determining, with a requisite degree of confidence, that the set of strokes analyzed represents a particular character from a selected character set.

Several solutions to the problems involved in handwriting recognition have been presented in the prior art.

Tappert, Suen, and Wakahara, "The State of the Art in On-Line Handwriting Recognition," IEEE Transactions on Pattern Analysis and Machine Intelligence, vol. 13, No. 8, 789–808 (1990) reflects the state of the handwriting recognition art as of 1989. This work describes seven methods for on-line character recognition. One of the relevant methods is that of the Time Sequence of Zones, which divides up a character into zones. The temporal sequence of visiting each zone is then used to classify. Therefore, the recognizer is very dependent on the exact ordering of stroke information.

Since 1989, researchers have used neural networks to recognize handwritten characters written on a tablet. For example, "Design of a Neural Network Character Recognizer for a Touch Terminal" by Guyon, Albrecht, LeCun, Denker, and Hubbard, Pattern Recognition, vol. 24, no. 2, pp. 105–119 (1991); and "Globally Trained Handwritten Word Recognizer Using Spatial Representation, Convolutional Neural Networks, and Hidden Markov Models," by Bengio, LeCun, and Henderson, Advances in Neural Information Processing Systems, vol. 6, Morgan Kaufman Pub. (1994) describe such systems.

In the paper by Guyon, et al., and in U.S. Pat. No. 5,105,468, strokes written on a tablet are digitized, then re-sampled to have a constant number of points per character. Features are extracted at every point. These features include an x and y position relative to the bounding box of the character, the angle of the tangent vector of the stroke, the curvature of the stroke, and whether the pen is up or down. The temporal history of all of these features is then presented to a convolutional neural network, which is trained to interpret these temporal histories as characters.

The main limitations of the work of Guyon, et al. is that the handwriting recognition system disclosed therein is dependent on the temporal order of the strokes and is somewhat insensitive to the relative spatial position of strokes written at different times. These are distinct disadvantages because relative spatial position is very important to the recognition of characters. Guyon, et al. attempt to ameliorate this problem by connecting together the beginning and the end of the stroke with a phantom pen-up stroke. This does not fully solve the problem, however.

In the paper by Bengio, LeCun, and Henderson, the strokes taken from a tablet are word normalized, then local features are extracted from small segments of the stroke. These features are similar to those in Guyon et al., U.S. Pat. No. 5,105,468, and U.S. Pat. No. 5,337,372 (a patent which is directed to some of the subject matter in the Bengio, et al. paper). The features are assigned to zones of a character, similar to the Time Sequence of Zones algorithm described by Tappert. These zone-assigned features are then organized into a series of feature images. Therefore, the spatial structure of the features is captured, and the less relevant temporal structure is repressed. These feature images are stored as a multidimensional array of cells, as discussed in U.S. Pat. No. 5,337,372. That array of cells is then fed to a convolutional neural network, which produces a graph of character candidates. Segmentation of words is performed either on the strokes, before being fed to the network, or on the output of the network, using a character-level Hidden Markov Model.

The system disclosed in the Bengio, et al. paper uses the spatial relationship between the features to discriminate between characters, which improves performance. The paper describes using a convolutional neural network operating on a non-sparse array of data. This system cannot exploit any sparseness in the input because it stores the input as an array and the convolutional network operates on all of the input data. Therefore, the Bengio system may be too slow on an inexpensive microprocessor.

U.S. Pat. No. 5,337,372 uses spatial feature maps similar to those described in Bengio et al. to feed into a nearest-neighbor memory. Nearest neighbor memories can be slow and take a large amount of memory. If the memory size is artificially limited, the accuracy suffers due to lack of discriminative training.

It is therefore an object of the present invention to provide a handwriting recognition system which overcomes the shortcomings of the prior art.

It is another object of the present invention to provide a handwriting recognition system which is capable of recognizing a wide variety of handwriting styles.

BRIEF DESCRIPTION OF THE INVENTION

According to the present invention, a handwriting recognition system includes three parts: pre-processing, a neural network, and post-processing. The pre-processing method employs six steps. First, the character is scaled. Next, the character strokes are re-parameterized. The stroke geometry is then measured. The stroke geometry is sparsely fuzzy encoded. These sparse fuzzy encodings are then combined into features. These features are then stored in a global sparse data structure, which is the result of the pre-processing. The global sparse data structure is then supplied to a neural network for recognition.

DETAILED DESCRIPTION OF A PREFERRED EMBODIMENT

Those of ordinary skill in the art will realize that the following description of the present invention is illustrative only and not in any way limiting. Other embodiments of the invention will readily suggest themselves to such skilled persons.

The handwriting recognition system and method of the present invention may be implemented as a dedicated hardware system or may be implemented to run on a general purpose computer. Unlike optical character recognition systems which analyze already-printed matter, the handwriting recognition system of the present invention relies on temporal information derived from the characters to be recognized. Therefore, the handwriting recognition system of the present invention accepts data from a tablet-like input device on which characters are formed using a pen-like stylus.

Figure 1:
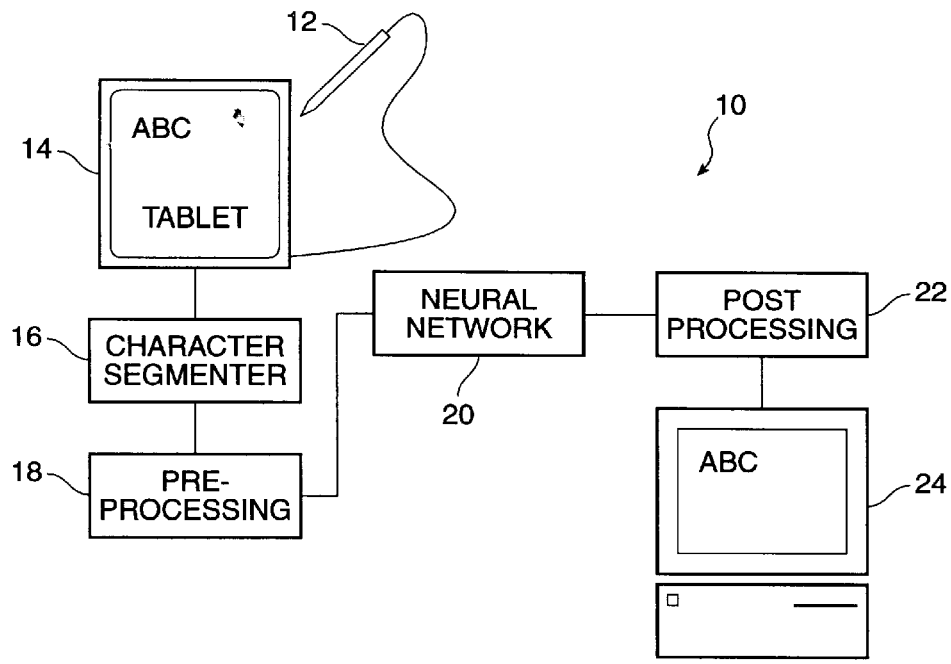
FIG. 1 is a block level diagram of the handwriting recognition system according to a preferred embodiment of the present invention.

Referring first to FIG. 1, a block diagram of a handwriting recognition system 10 according to a presently preferred embodiment of the invention is shown. The user provides input in the form of handwritten characters formed by, for example, a stylus 12 onto a tablet input device 14. A character segmenter 16 operates to segment the characters into individual characters. Character segmentation is well known in the art. The first part of the system of the present invention is a pre-processing unit 18 which performs pre-processing from information received from the stylus/tablet input device 14 and character segmenter 16.

The results of the pre-processing in the pre-processing unit 18 are presented to a standard multi-layer neural network 20, with sigmoidal non-linearities. The neural network 20 comprises the second part of the handwriting recognition system 10.

The output of the neural network 20 is presented to a post-processing unit 22. Post-processing unit 22 comprises the third part of the handwriting recognition system 10 of the present invention. The output of post-processing unit 22 may be utilized by a computer shown at reference numeral 24 and shown on its display, or may be stored in a conventional storage device for later use as is known in the art.

On a block diagram level, the general architectural arrangement of a handwriting recognition system is known in the prior art. However, according to the present invention, and as will be further disclosed herein, the nature and configuration of the individual parts of the handwriting recognition system 10 and the manner in which they interact and operate provides a unique system with distinct advantages over the prior art handwriting recognition systems.

Persons of ordinary skill in the art will also appreciate the present invention's utility in recognizing unsegmented handwriting where alternative hypothesized segmentations are evaluated by recognition. An example of such a system is shown in U.S. Pat. No. 4,731,857 to Tappert. This alternative segmentation testing is well known in the prior art of handwriting recognition, speech recognition, and optical character recognition. In this case, the post-processing unit 22 must choose between different segmentation candidates.

A character to be recognized consists of a set of strokes, which contain the positional and temporal data obtained when the pen or stylus 12 is in contact with the tablet input device 14. Data provided by the tablet input device 14 when the pen 12 is in proximity, but not touching the tablet input device 14, is ignored.

For the purposes of this disclosure, it is assumed that the characters are already segmented by character segmenter 16, i.e., they are hand-printed block characters rather than cursive script. If the strokes are written in a grid, the centroids of the strokes can be used to determine the identity of the grid into which the stroke was written, thus segmenting the character as shown by character segmenter 16. This centroid technique is well known to those of ordinary skill in the art.

The presently preferred embodiment for the computations set forth in this disclosure are in 16-bit fixed point arithmetic, with 8 bits after the decimal point. However, and as will be readily appreciated by those of ordinary skill in the art, the scope of the invention should not be limited to using this specific arithmetic representation. Such skilled persons will be readily able to envision alternate computational formats which will nonetheless embody the teachings herein.

The first part of the handwriting recognition system 10 of the present invention comprises the pre-processing of the set of strokes comprising the character or characters to be recognized. As is illustrated in FIG. 2, a flow diagram of the processing steps in the pre-processing unit 18 (FIG. 1) of the handwriting recognition system 10 of the present invention, there are six steps performed in the pre-processing according to the present invention.

First, at step 30, the character is scaled. The strokes are then re-sampled at step 32. The stroke geometry is then measured at step 34. The stroke geometry is then sparsely fuzzy encoded at step 36. The sparse fuzzy encodings are combined at step 38 to produce features. Finally, the features are then collected into a sparse data structure at step 39.

The first step of the pre-processing of the present invention scales, or normalizes, the character. As will be appreciated by persons of ordinary skill in the art, character scaling is performed in order to make the operation of the handwriting recognition system of the present invention independent of the original size of the character. In view of this objective, the scaling function of the system of the present invention is performed prior to the re-parameterization step in order to make the reparameterization step independent of scale.

Figure 2:
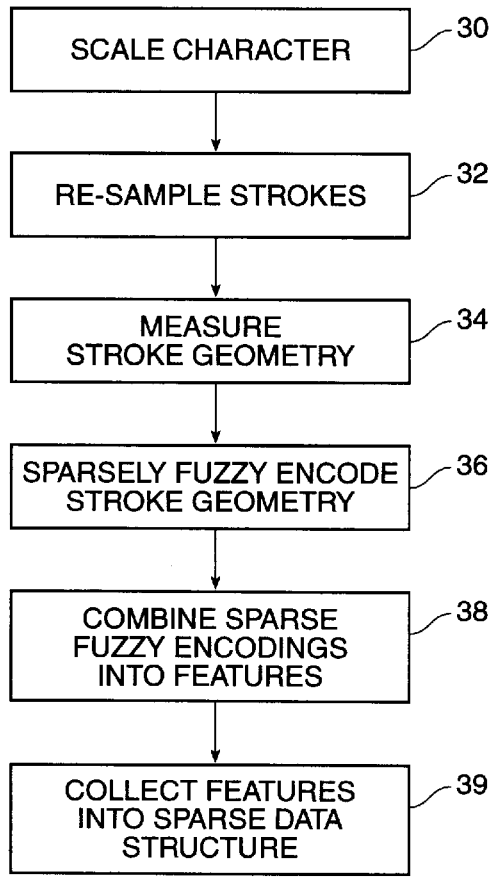
FIG. 2 is a block level diagram of the processing flow of the pre-processing stage of the handwriting recognition system of FIG. 1.

During the scaling process of step 30 in FIG. 2, the width and the height of each character is measured. A uniform scaling in x and y is then applied in order to make the larger of either the height or width of each character equal to one.

Figure 3:
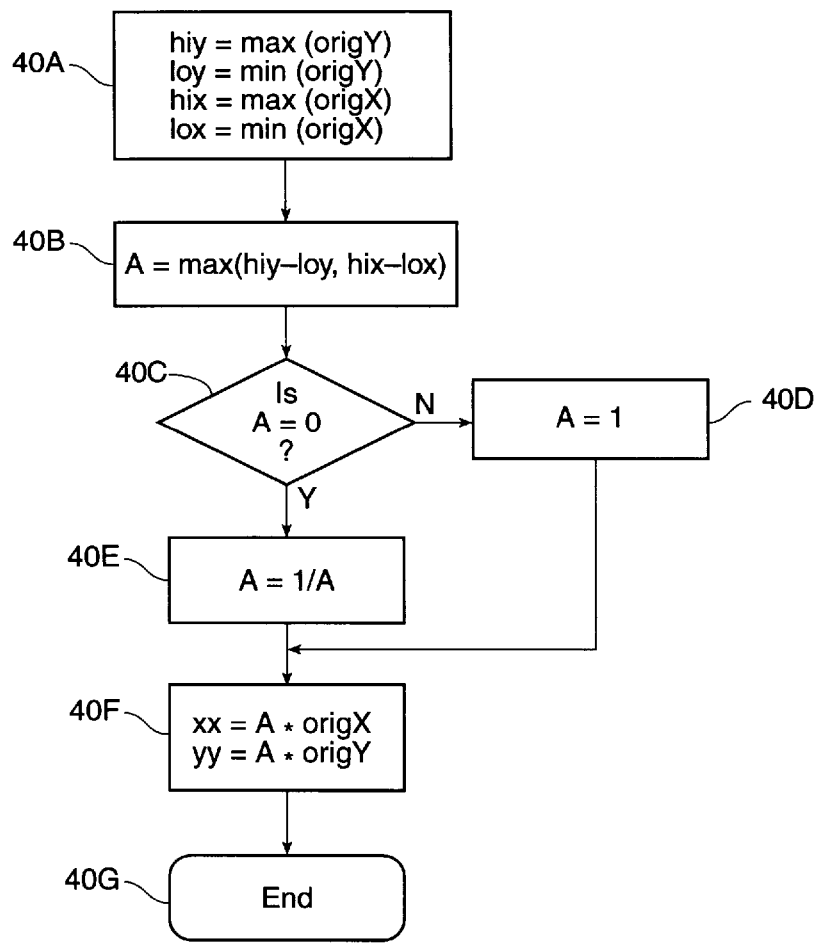
FIG. 3 is a diagram illustrating the character scaling feature of the present invention.

FIG. 3 is a flowchart which illustrates the preferred embodiment of the present invention's character scaling. Step 40A of FIG. 3 computes the bounding box for the character. The variables origX and origY are the list of x and y values of the character before scaling. The variables hiy and loy are the highest and lowest y values of the character, respectively. The variables hix and lox are the highest and lowest x values of the character, respectively. Step 40B then computes the maximum of the height and the width, and places it into variable A. Decision diamond 40C then checks to see if the character is zero size (which may happen if there is only one pen-down sample). If so, then step 40D loads variable A with a scale factor of one. Otherwise, step 40E loads variable A with a scale factor which is the reciprocal of the larger of the height and the width. Step 40F then scales all of the x and y values of the character by A. Step 40G then ends the flow chart.

For the convenience of those skilled in the art, the character scaling process is also shown below as psuedocode:

```
Let origX = original x-position of pen as a function of time (a vector)
Let origY = original y-position of pen as a function of time (a vector)
hiy = max(origY)
loy = min(origY)
hix = max(origX)
lox = min(origX)
A = max(hiy-loy, hix-lox)
if A == 0
    A = 1
else
    A = 1/A
xx = re-scaled x-position of pen as a function of time (a vector)
yy = re-scaled y-position of pen as a function of time (a vector)
xx = A*origX
yy = A*origY
```

The values loy and hiy are later used by post-processing unit 22 in order to make a determination of the case (upper or lower) of the character.

This scaling step 30 performed in accordance with the present invention is unlike prior art processes such as those described in, for example, U.S. Pat. No. 5,105,468. Because scaling process such as the one described therein always scales characters to be unit height, dashes become extremely long and/or non-horizontal. In contrast, and as illustrated in FIG. 3, the scaling method described herein as used in the present invention always guarantees that the character fits in a box that is 1 unit on a side. This condition is ideal for input to a neural network.

The re-sampling step 32 of FIG. 2 is performed next. Such a re-sampling step is well-known in the prior art through examples such as are found in U.S. Pat. No. 5,105,468 to Guyon, et al. Re-sampling is used to obtain a regular spacing in arc length of points along the data. When the data is re-sampled, linear interpolation between the existing data points is used. Linear interpolation is wellknown and is described in numerical analysis texts. See, e.g., Numerical Recipes in C, by Press, Vetterling, Teukosky, and Flannery, 2nd edition, p 114, Cambridge University Press (1992). As is presently preferred, the distance between each point where measurements are taken is 0.1 (one tenth of the scaled maximum).

After the re-sampling step 32, the geometry of the stroke is measured at step 34 of FIG. 2. For every point that is produced by the re-parameterization, (x[i],y[i]), the horizontal and vertical position of the point, the direction of the stroke at the point, the curvature of the stroke at the point, and whether the stroke has a pen-up/pen-down transition at the point are computed.

The horizontal and vertical position of each point is computed relative to the bounding box of the entire character. The horizontal and vertical positions are determined so that the character is centered in the box [0,1]×[0,1]. The manner of making such determinations is well-known in the art, as illustrated in U.S. Pat. No. 5,105,468 to Guyon.

The direction and curvature of the stroke at each point are also determined. Determining the direction and curvature at a point in a curve is well-known in the field of numerical analysis. A review of direction and curvature computation is described in U.S. Pat. No. 5,105,468.

For the purposes of this disclosure, the direction of the stroke at point i is computed by taking the arc tangent of the vector between point i−1 and point i+1. This is true except at the end points, where the direction is computed from adjacent points. This direction determination is shown as pseudo-code below, for convenience of those skilled in the art:

```
Let x = vector of re-parameterized x points
Let y = vector of re-parameterized y points
Let len = length of stroke
Result of computation: theta = vector of direction at every point
theta [0] = atan2 (y[1] − y[0], x[1] − x[0])
for (i = 1; i < len-1; i++)
    {
        theta[i] = atan2(y[i+1]−y[i−1], x[i+1]−x[i−1])
    }
theta [len-1] = atan2 (y[len-1]−y[len-2], x[len-1]−x[len-2])
```

The direction determination uses the well known atan2 function, which yields directions that range from −pi to pi.

The curvature at point i is a measurement of the change in direction between adjacent pairs of points (i−1, i) and (i, i+1) in the stroke. The curvature is not defined on the endpoints. For convenience of those skilled in the art, the determination of curvature is shown as pseudo-code, below:

```
Let x, y and len be as above.
Result ot computation: kappa = vector of curvature at every point
oldth = atan2(y[1]-y[0], x[1]-x[0])
for(i = 1; i < len-1; i++)
    {
    th = atan2 (y[i+1]-y[i], x[i+1]-x[i])
    kappa [i] = th-oldth;
    if (kappa [i] > pi)
        kappa [i] = kappa [i] - 2*pi;
    else if (kappa [i] < -pi)
        kappa [i] = kappa [i] + 2*pi;
    oldth = th
    }
```

This determination of curvature yields values that range between -pi and pi, with zero for a straight stroke.

Figure 4:
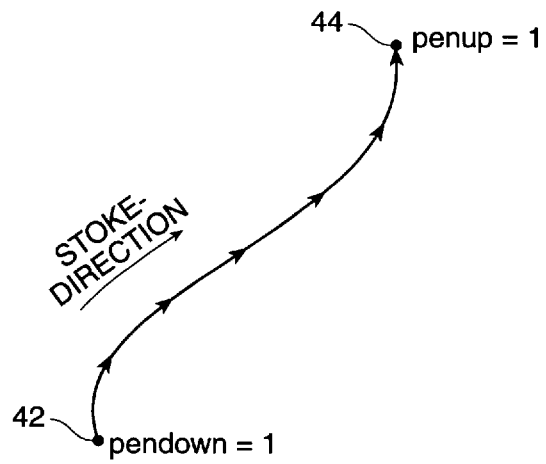
FIG. 4 is a diagram illustrating the pen-down and pen-up feature of the present invention.

According to one aspect of the present invention, illustrated with reference to FIG. 4, the pen-up and pen-down transitions are represented by two values at every point in each stroke: pendown and penup. As shown in FIG. 4, the value pendown is equal to one at point 42 for the first point of the stroke, and is zero otherwise. The value penup is equal to one for the last point 44 of the stroke at which the pen or stylus is in contact with the writing surface of the tablet, and is equal to zero otherwise.

The identification of the first and last point of a pen-down stroke as features for a neural network is believed to be unknown in the art. The inventors have discovered that the startpoint and endpoint positions of strokes are very informative features which are useful to disambiguate certain character pairs.

Figure 5:
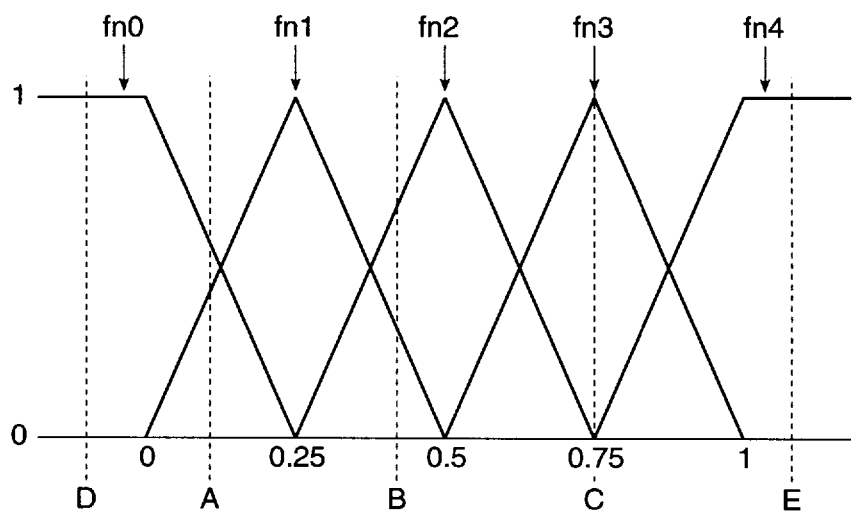
FIG. 5 is a diagram showing a typical fuzzy encoding employed in the handwriting recognition system of the present invention.

After all of the geometry has been determined, it is sparsely encoded at step 36 of FIG. 2 using fuzzy membership functions. The fuzzy encoding of variables makes training the neural network much easier, and also allows the neural network to make fine distinctions between different directions and curvatures of strokes. This sparse encoding transforms original continuous variables in some range into a vector of variables as is illustrated in FIG. 5. Each element of this vector represents a subrange of the variable. The value of each vector element is a measure of the match between the original variable and the center of the subrange. The encoding of continuous variables using fuzzy membership functions is known in the prior art and is described, for example, in "Neural Networks and Fuzzy Systems" by Bart Kosko, p. 27, Prentice-Hall (1991).

As an example of the fuzzy membership encoding according to the present invention illustrated in FIG. 5, if a variable is to be encoded with 5 membership functions (fn0 through fn4) which encode the range [0,1], the 5 variables represent the closeness to the points $c[i]=\{0.0, 0.25, 0.5, 0.75, 1.0\}$.

An original value of 0.1 (point A in FIG. 5) would then produce a fuzzy encoding of 0.6, 0.4, 0, 0, 0. An original value of 0.4 (point B in FIG. 5) would then produce a fuzzy encoding of 0, 0.2, 0.8, 0, 0. Similarly, an original value of 0.75 (point C in FIG. 5) would produce a fuzzy encoding of 0, 0, 0, 1, 0.

Original values that lie outside the fuzzy encoding range are encoded the same as the nearest extreme value of the range. This is shown by reference to points "D" and "E" on FIG. 5:

```
-0.2 (point D in FIG. 5) becomes:
    1, 0, 0, 0, 0
1.4 (point E in FIG. 5) becomes:
    0, 0, 0, 0, 1
```

Figure 6:
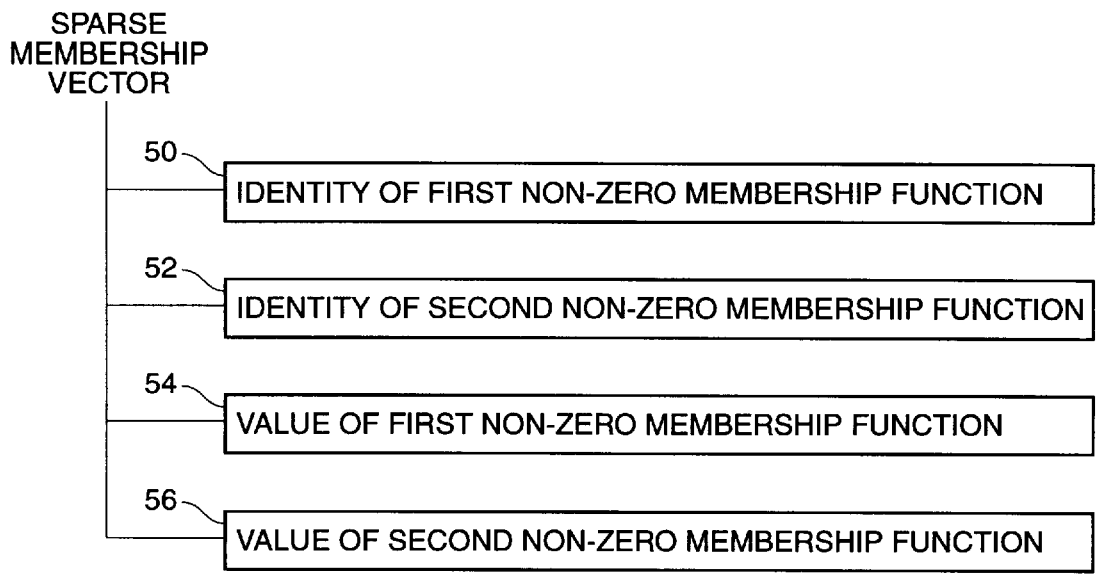
FIG. 6 is an illustration showing the sparse membership vector employed in the handwriting recognition system of the present invention.

One distinct advantage of the system of the present invention derives from the realization that only a maximum of two non-zero values need be computed during the fuzzy encoding, regardless of the number of membership functions. Therefore, a sparse representation can be used to represent the membership vector. Four numbers represent the membership vector: two identities and two values, which are the values of the vector whose index equals the corresponding identity. All other values are assumed zero. FIG. 6 shows the sparse membership vector data structure employed in the present invention. Box 50 represents the identity of the first non-zero membership function; box 52 represents the identity of the second non-zero membership function; box 54 represents the value of the first non-zero membership function; and box 56 represents the value of the second non-zero membership function. The sparse membership vector shown in FIG. 6 has slots for a maximum of two non-zero membership functions. However, both of these slots need not represent non-zero membership functions. If a value similar to values D or E in FIG. 5 are encoded as a sparse membership vector, then one of the slots will represent a non-zero membership function, while the other slot's value will be zero.

Figure 7:
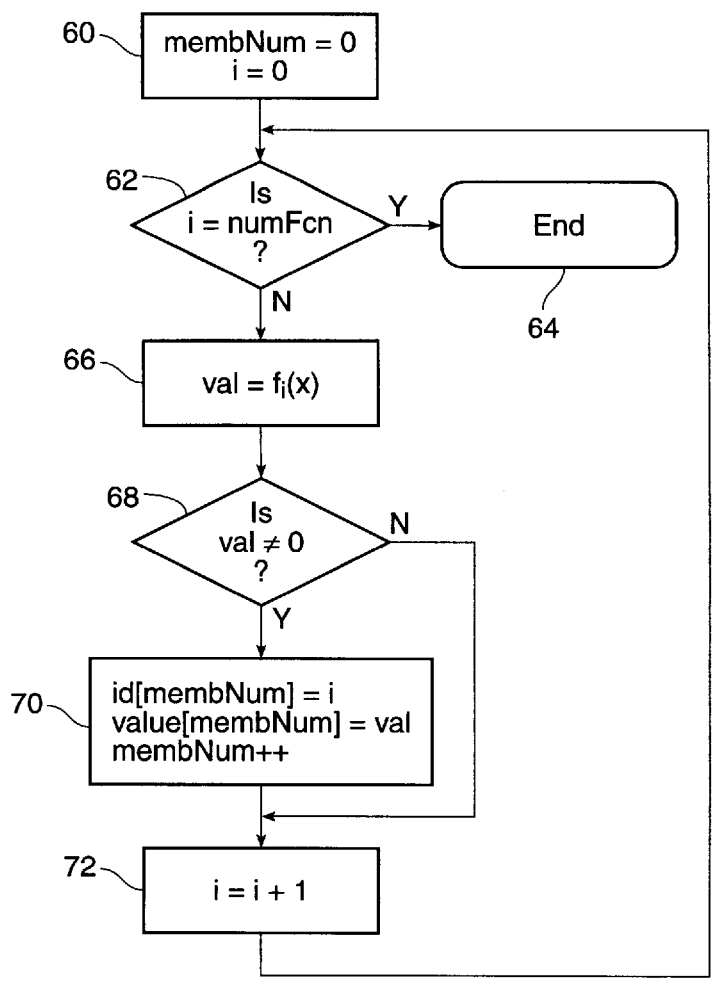
FIG. 7 is a flow diagram of the determination of a general sparse membership vector according to the present invention.

The determination of a general sparse membership vector is shown in the flow diagram of FIG. 7. For the convenience of those of ordinary skill in the art, the process of determining the sparse membership vector is also shown below in pseudo-code:

```
Let x = value being encoded
let numFcn = number of membership functions
Let fi = ith membership function
Results of computation:
    id[n] = identity of nth non-zero membership function
    value[n] = value of nth non-zero membership function
membNum = 0
for (i = 0; i < numFcn; i++)
    {
    val = fi(x)
    if (val != 0)
        {
        id[membNum] = i
        value[membNum] = val
        membNum++
        }
    }
```

In the above algorithm, fi(x) computes the value of the ith membership function, including any end point conditions (e.g, for some membership functions, fi(very large value)= 1).

Referring now to the flow diagram of FIG. 7, step 60 initializes the variables membNum, which serves as a counter for the number of non-zero membership functions; and i, which is a counter that indicates the current membership function. Decision diamond 62 tests to see if all of the membership functions have been evaluated. If so, the process is finished as shown at "End" 64. Otherwise, the ith membership function is evaluated by step 66, the value being stored in variable val. Decision diamond 68 checks to see if this value is non-zero. If so, the sparse membership data structure is updated in step 70. Step 72 increments the membership function counter, and the chart flows back to decision diamond 62 to determine termination.

Because of the specialized structure of a typical fuzzy encoding, as shown in FIG. 5, the preferred embodiment unrolls the loop in the above determination and only evaluates the non-zero membership functions, and handles end point conditions separately.

Figure 8:
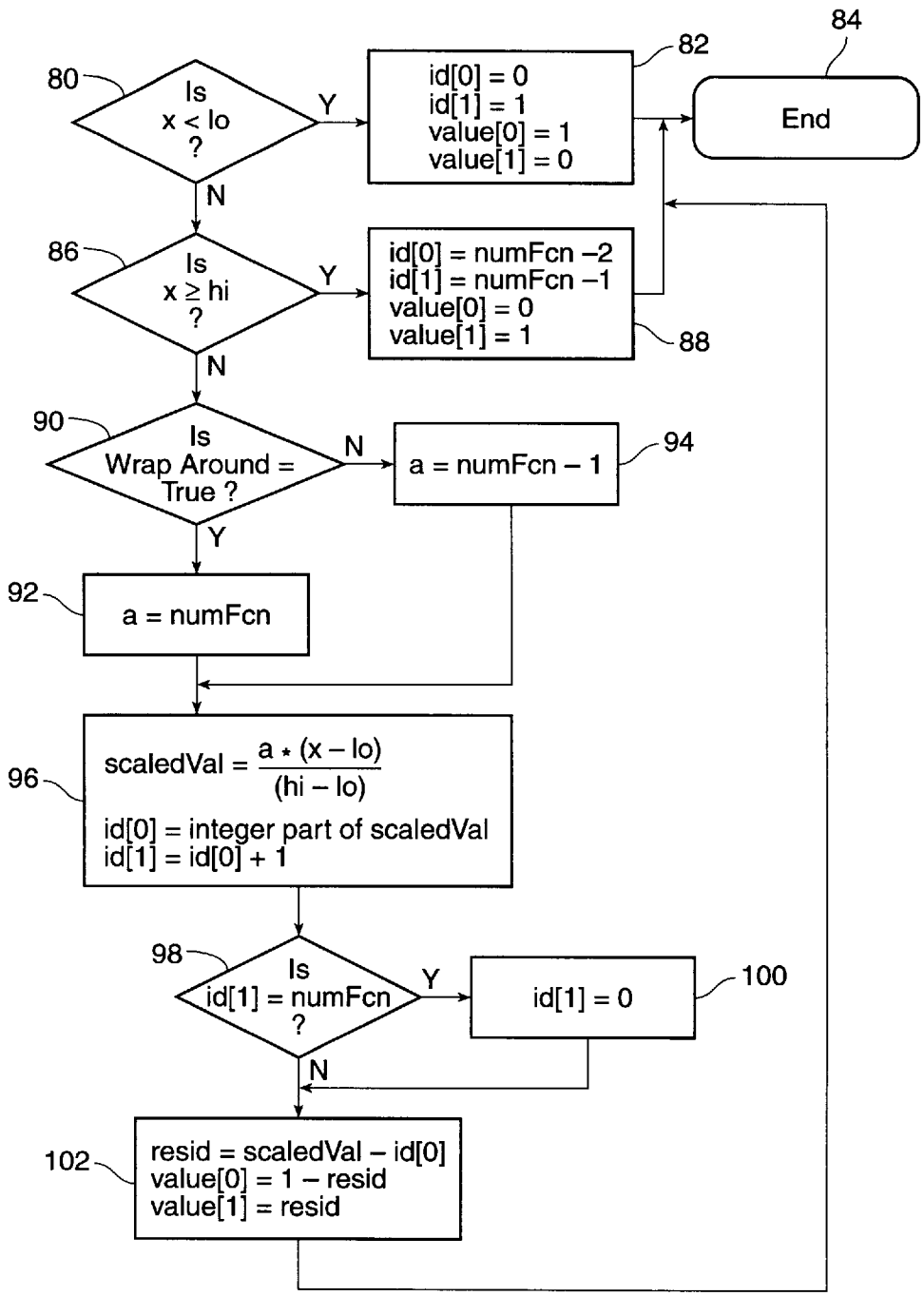
FIG. 8 is a flow chart illustrating the preferred embodiment of the determination of the sparse membership vector according to the present invention.

Referring now to the flow chart of FIG. 8, the preferred embodiment of the creation of a sparse fuzzy membership vector is shown. At decision diamond 80, the continuous input variable x is tested against the lowest value represented by the fuzzy encoding. If x is lower than the lowest encoded fuzzy value, then step 82 creates a sparse fuzzy membership vector where the lowest fuzzy membership function's value is one, and all others are zero. The process would then end as indicated at the "End" step 84. If x was not lower than the lowest fuzzy encoded value, decision diamond 86 tests whether x is greater than or equal to than the highest encoded fuzzy value. If so, then step 88 creates a sparse fuzzy membership vector where the highest fuzzy membership function's value is one, and all others are zero. The process would then end at 84. The order of steps 80 and 86 are interchangeable.

If x was not higher than the highest encoded fuzzy value, decision diamond 90 determines whether the fuzzy membership functions wrap around. If so, then step 92 sets a scale factor, a, to be the number of fuzzy membership functions. If not, then step 94 sets the scale factor to be the number of fuzzy membership functions minus one. Step 96 then scales the input value x, and places the result in scaledVal. The variable scaledVal has a range of [0, numFcn-1] for non-wrapped functions and [0, numFcn) for wrapped functions. Step 96 then determines the identities of the two non-zero membership functions. The first, id[0], is the integer part (rounded down) of scaledVal. The second, id[1], is id[0]+1. The fuzzy membership function identities range between 0 and numFcn-1. The only way id[1] can equal numFcn is if the membership functions are allowed to wrap. Decision diamond 98 determines whether id[1] is equal to numFcn, and if so step 100 wraps the identity of the second non-zero membership function to be zero.

Finally, step 102 computes the values of the non-zero membership functions. Step 102 assumes that the membership functions are triangular. First, step 102 determines the distance of the input to the first non-zero membership function's encoded value, in a space where the distance between encoded values is one. The value of the first non-zero membership function, value[0], is then one minus this distance, and the value of the second non-zero membership function, value[1], is this distance. After performance of step 102, the process ends at 84.

Again, for the convenience of those of ordinary skill in the art, the flow chart of FIG. 8 may be expressed as pseudocode as follows:

```
Let x = value being encoded
Let lo = lowest value encoded by the fuzzy encoding
Let hi = highest value encoded by the fuzzy encoding
Let numFcn = number of membership functions
let wrapAround = whether the last membership function is the same as the
first
Results of computation:
        id[0] = identity of first non-zero membership function
        id[1] = identity of second non-zero membership function
        value[0] = value of first non-zero membership function
        value[1] = value of second non-zero membership function
if (x < lo)
    {
        id[0] = 0
        id[1] = 1
        value[0] = 1
        value[1] = 0
    }
else if (x >= hi)
    {
        id[0] = numFcn-2
        id[1] = numFcn-1
        value[0] = 0
        value[1] = 1
    }
else
```

-continued

```
    {
        a = numFcn
        if (wrapAround == FALSE)
        a -= 1;
        scaledVal = a*(x-lo)/(hi-lo)
        id[0] = integer part of scaledVal
        id[1] = id[0]+1;
        if (id[1] ==numFcn)
            id[1] =0;
        resid = scaledVal-id[0]
        value[0] = 1-resid;
        value[1] = resid;
    }
```

According to a presently preferred embodiment of the handwriting recognition system of the present invention, the position, the direction, and the curvature are encoded at every point using fuzzy membership functions. These continuous point-wise variables are encoded according to the following Table 1. Table 1 also lists the name of the structure that stores the membership vector at each point.

TABLE 1

| Point-wise Variable | # of Membership Functions | Range of encoding | Name of Sparse Membership Vector |
|---|---|---|---|
| centered x position | 5 | [0,1] | X |
| centered y position | 5 | [0,1] | Y |
| direction | 8 | [-pi,pi] | D |
| curvature | 10 | [-pi/4,pi/4] | C |

Figure 9:
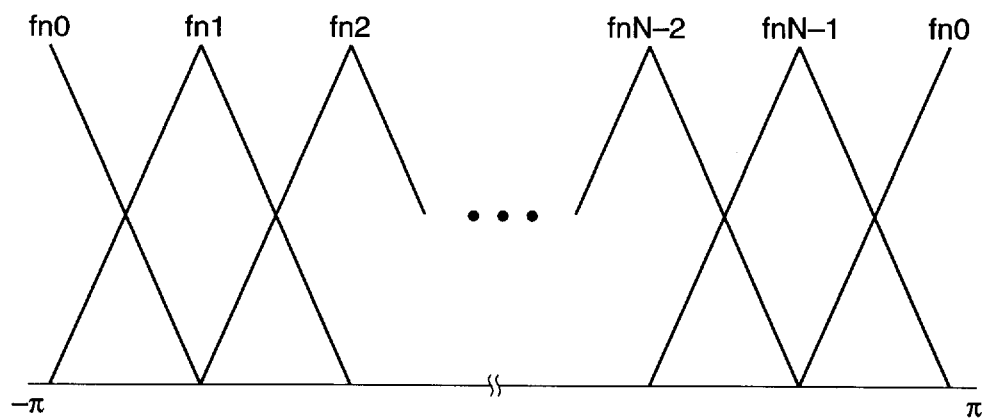
FIG. 9 is a diagram illustrating fuzzy encoding of the direction variable according to the present invention.

Referring now to FIG. 9, a diagram illustrating fuzzy encoding of the direction variable according to the present invention, it may be seen that the encoding of the direction is special, because the range of angles wraps back upon itself. Therefore, as may be seen from an examination of FIG. 9, the membership function that represents pi is the same as the membership function that represents -pi. This prevents any discontinuity in the representation. In step 90 of the flow chart of FIG. 8, wrapAround is TRUE for the encoding of direction, and FALSE otherwise.

The handwriting recognition system of the present invention uses a full range of direction from -pi to pi, unlike the prior art as represented by U.S. Pat. No. 5,337,372, which only uses zero to pi. A discovery which forms part of the present invention is the finding that utilizing the true direction of the stroke dramatically aids in the recognition of characters, because certain characters may look similar, but have a dramatic stroke direction difference.

Figure 10:
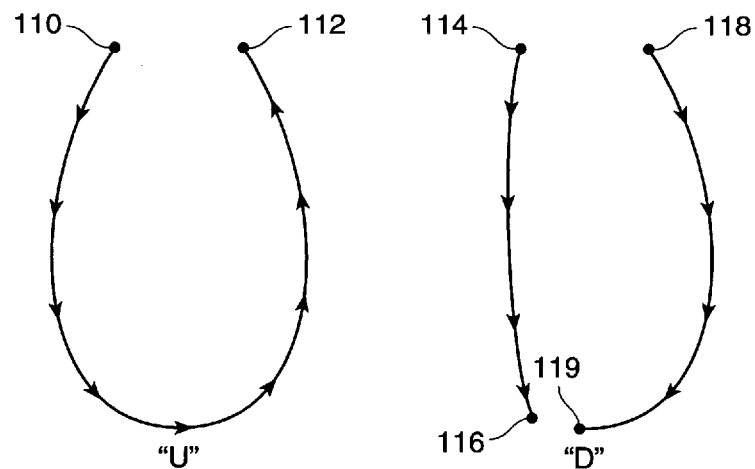
FIG. 10 is a diagram of the strokes comprising the uppercase characters "U" and "D" and showing the importance of stroke direction in the handwriting recognition system of the present invention.

This feature of the handwriting recognition system of the present invention is illustrated with reference to FIG. 10. FIG. 10 is a diagram of the strokes comprising possible written uppercase characters "U" and "D" and showing the importance of stroke direction in the handwriting recognition system of the present invention. The differences in presentation of the "U" and "D" characters in FIG. 10 is somewhat ambiguous from the standpoint of shape alone; but this circumstance is altogether possible in human handwriting. However, when direction information is considered along with the shape information, the ambiguity disappears. Thus, the "U" character has a single pen-down point 110 and a single pen-up point 112 with a stroke in a continuous direction as shown by the arrows along the stroke line. In contrast, the "D" character has a first stroke having a pen-down point 114 and a pen-up point at 116 and a second stroke having a pen-down point 118 and a pen-up point at 119.

The present invention is not limited to the particular simple fuzzy membership functions as described above, but includes any reasonable encodings of the input which yield a maximum of two (or a small number) of non-zero membership values per point.

At every point, a vector of binary point-wise variables, called P, is created. In the preferred embodiment, P is a vector of length 2: P[0]=pendown (whether this point is the first point of the stroke), P[1]=penup (whether this point is the last point of the stroke.)

Figure 11:
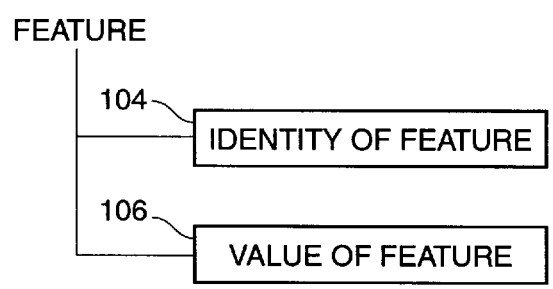
FIG. 11 is a diagram illustrating a feature, which is a data structure.

Given the sparse membership vectors and binary point-wise variables per point, the handwriting recognition system of the present invention then proceeds to create a sparse data structure which describes combinations of these membership vectors and binary point-wise variables, as described below. First, for every point, a set of sparse membership vectors and binary variables is determined. Next, a set of features is determined from these vectors and binary variables. A feature is a data structure shown in FIG. 11, with an id number (an integer) shown as box 104 and a value shown as box 106. The id number of a feature corresponds to the identity of the particular input of a neural network (or other recognizer) to which that feature will eventually be supplied. The value of the feature will be the value that will be supplied to the neural network.

Figure 12:
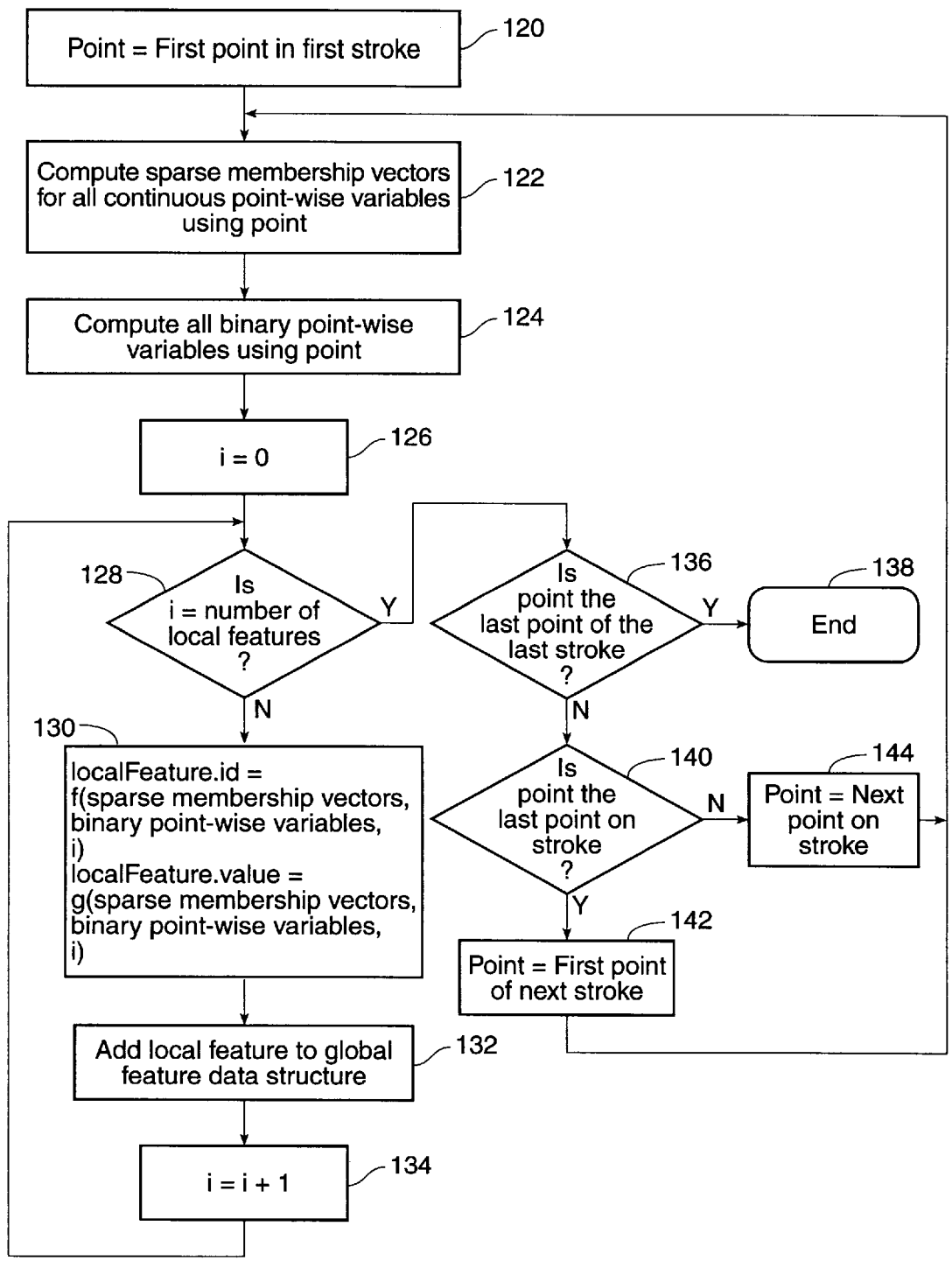
FIG. 12 is a flow chart illustrating the general combination of the sparse membership vectors according to the present invention.

For every point in every stroke, a set of local features is determined. These local features are then stored in a sparse global feature data structure, which holds all of the features for the entire character. The membership functions may be determined as shown in the flow chart of FIG. 12. For the convenience of persons of ordinary skill in the art, the flow chart of FIG. 12 is reproduced as pseudo-code as follows:

```
{
    for every continuous point-wise variable
    {
        Compute sparse membership vector (FIG. 7 or FIG. 8)
        using current point
    }
    for every binary point-wise variable
    {
        Compute binary point-wise variable using current point
    }
    for (i = 0; i < numberOfLocalFeatures; i++)
    {
        localFeature.id = f(sparse membership vectors1
            binary point-wise variables, i)
        localFeature.value = g(sparse membership vectors,
            binary point-wise variables, i)
        add localFeature to global feature data structure
        (FIG. 14 or FIG. 15)
    }
}
```

The function f is a hashing function, which maps the large space of all possible variable combinations into the set of neural network inputs. The function f can be a one-to-one function or a many-to-one function. The function f can depend on i, because the id number of a local feature usually depends on which combination of features are used.

The function g is a function which combines the values of the encoded point-wise variables and produces a local feature value. Examples of g include multiplying all of the values, or taking the max over all of the values.

Referring now to FIG. 12, the flow chart begins with step 120, which initializes the current point to the first point in the first stroke. Step 122 then determines the sparse membership vectors for all of the continuous point-wise variables. Step 122 applied the flow chart of FIG. 7 or FIG. 8 to the current point. Then, step 124 determines all of the binary point-wise variables using the current point. Step 126 then initializes a loop counter, i, which counts the number of local features processed so far. Step 128 then checks to see whether all of the local features have been processed. If not, processing flows to step 130, which computes the ith local feature. The identity of the ith local feature is a function, f, of the sparse membership vectors, the binary point-wise variables, and i. The identity will range from zero to the number of possible features-1. Step 130 also computes the value of the ith local feature, which is a function, g, of the sparse membership vectors, the binary point-wise variables, and i. In a preferred embodiment, the value g ranges from zero to one. Step 132 then adds the local feature to the global feature data structure. Step 132 uses the process described in the flow chart of FIG. 14 or FIG. 15, described below. Finally, step 134 increments the local feature counter and the system flows back to decision diamond 128.

If decision diamond 128 determines that all of the local features have been processed, then the system determines the next point to be processed. Decision diamond 136 determines whether the current point is the last possible point of the character. If so, then the process is finished at "End" 138. Otherwise, decision diamond 140 determines if the current point is the last point on the current stroke. If so, then step 142 sends the current point to be the first point of the next stroke, otherwise step 144 sets the current point to be the next point of the current stroke. In either event, the process flows back to step 122.

The enumeration of the local features does not have to be performed using only one loop, nor must every point-wise variable be combined with every other point-wise variable. In the preferred embodiment of the present invention illustrated below, nested loops are used to enumerate the local features, and only three point-wise variables are combined at a time. Notice that in the preferred embodiment, penup feature, pendown features, and curvature features are mutually exclusive. This is because the curvature is not defined on the end points of the stroke.

Figure 13A:
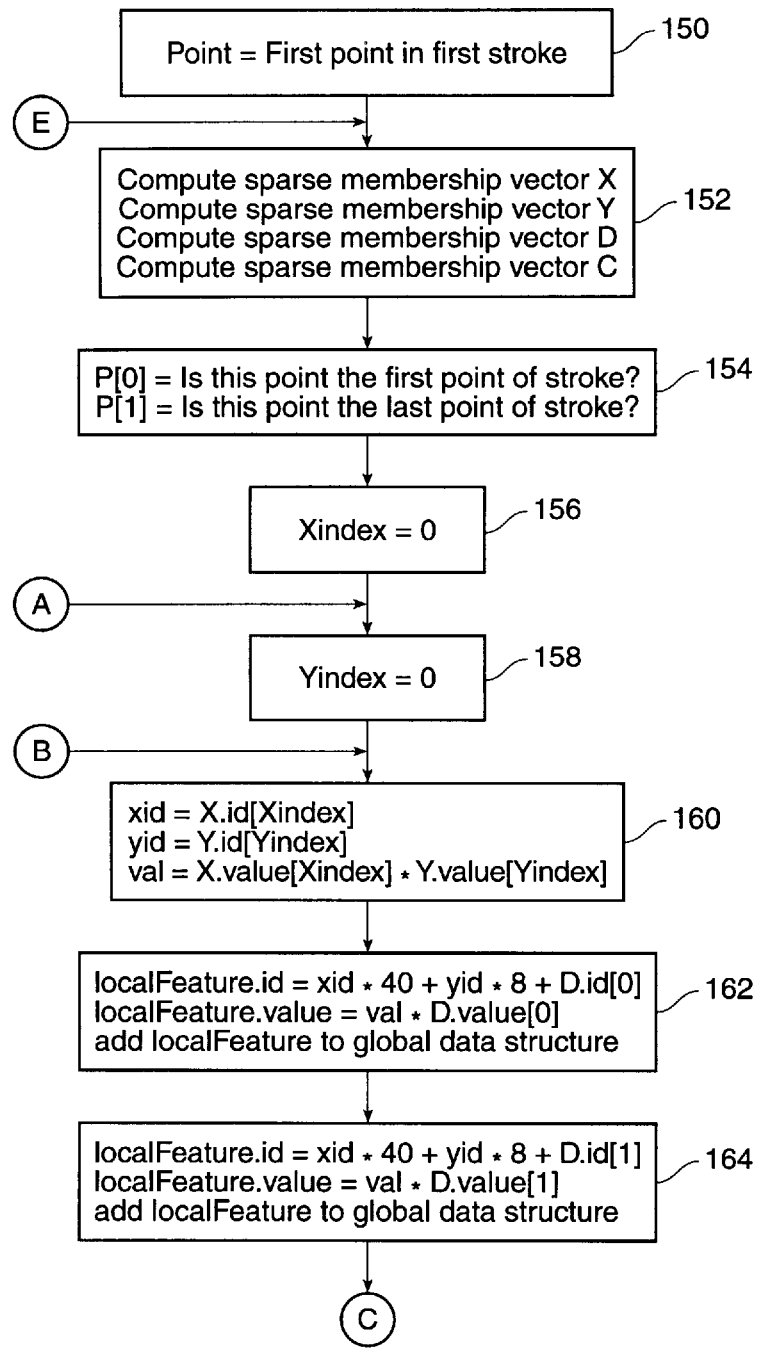
FIGS. 13a, 13b, and 13c together comprise a flow chart illustrating the preferred embodiment of the combination of sparse membership vectors according to the present invention.
Figure 13B:
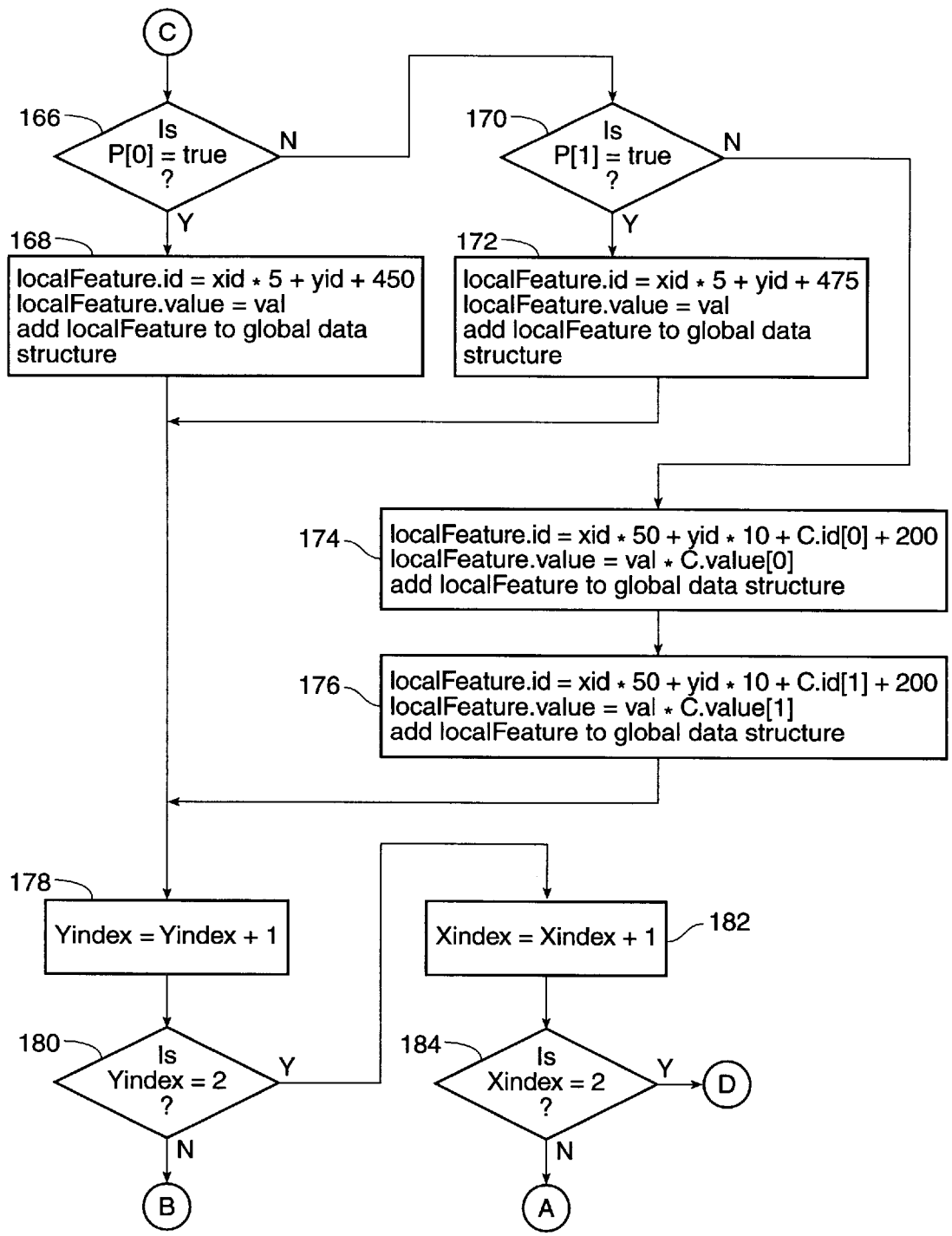
Figure 13C:
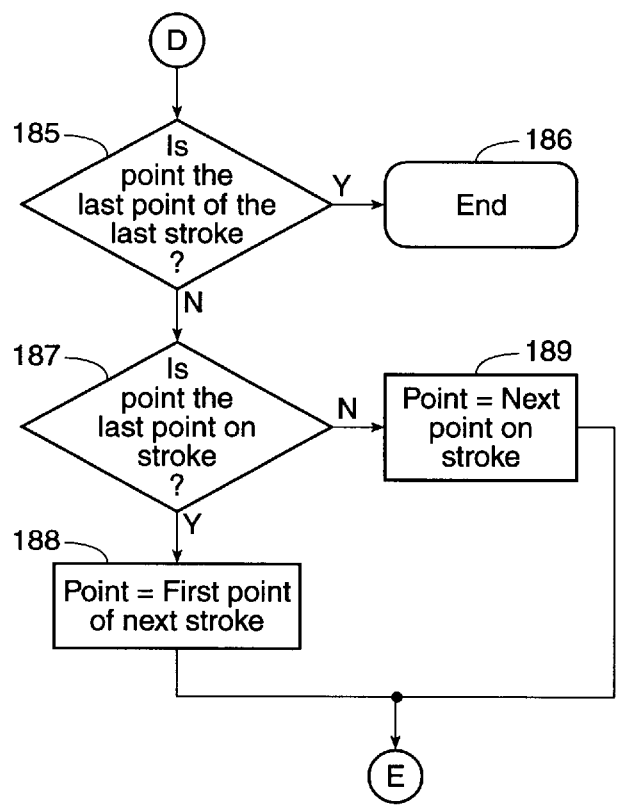

Referring now to the flow charts of FIGS. 13a, 13b and 13c, the preferred embodiment of the combination of sparse membership vectors is shown. The flow charts of FIGS. 13a, 13b and 13c are also presented below in pseudo-code as follows:

```
{
    Compute sparse membership vector X (FIG. 8)
    Compute sparse membership vector Y (FIG. 8)
    Compute sparse membership veotor D (FIG. 8)
    Compute sparse membership vector C (FIG. 8)
    P[0] = Is this point first point of stroke? (pendown)
    P[1] = Is this point last point of stroke? (penup)
    for (Xindex = 0; Xindex < 2; Xindex++)
        for #index = O; Yindex < 2; Yindex++)
        {
            xid = X.id[Xindex]
            yid = Y.id#index]
            val = X.value[Xindex]*Y.value[Yindex]
            localFeature.id = xid*40+yid*8+D.id[0]
            localFeature.value = val*D.value[0]
            add localFeature to global data structure (FIG. 14 or FIG. 15)
            localFeature.id = xid*40+yid*8+D.id[1]
        localFeature.value = val*D.value[1]
        add localFeature to global data structure (FIG. 14 or FIG. 15)
        if(P[0] == 1)
        {
            localFeature.id = xid*5+yid+450
            localFeature.value = val
            add localFeature to global data structure (FIG. 14 or FIG. 15)
        }
        else if (P[1]== 1)
```

```
        {
            localFeature.id = xid*5+yid+475
            localFeature.value = val
            add localFeature to global data structure (FIG. 14 or FIG. 15)
        }
        else
        {
            localFeature.id = xid*50+yid*10+C.id[0]+260
            localFeature.value = val*C.value[0]
            add localFeature to global data structure (FIG. 14 or FIG. 15)
            localFeature.id = xid*50+yid*10+C.id[1]+200
            localFeature.value = val*C.value[1]
            add localFeature to global data structure (FIG. 14 or FIG. 15)
        }
    }
}
```

The flow chart of FIGS. 13a, 13b and 13c starts with step 150, which initializes the current point to be the first point of the first stroke of the character. Step 152 uses the flow chart of FIG. 7 or FIG. 8 to compute the sparse membership vectors X, Y, D, and C. Step 154 then determines the point-wise vector P. The two nested loops are initialized by steps 156 and 158. The order of these loops in unimportant. Step 160 computes some convenience variables: xid, yid, and val. The variable xid indicates which x membership function is currently being used. The variable yid indicates which y membership function is currently being used. The variable val is a combination of the values of the current x membership function and the current y membership function. Step 160 is not essential to the invention: it is only a convenience. Steps 162 and 164 compute the combination of the positional membership functions with the directional membership function, D. The identity of the local feature is computed using a hash function which allows all possible combinations of X, Y, and D to have a unique number. The local feature's value is the combination of the X, Y, and D values. Step 162 operates on the first non-zero directional membership function, while step 164 operates on the second non-zero directional membership function.

Referring now to FIG. 13b, control then flows to decision diamond 166, which determines whether P[0] is true. That is, decision diamond 166 determines whether the current point is the first point of a stroke. If so, control flows to step 168, which then computes a local feature that combines P[0], X, and Y. The identity of the local feature is a hash function which creates unique numbers for these features. The value is simply the combined value of the X and Y membership functions. The local feature is then added to the global data structure. If P[0] is not true, control flows to decision diamond 170, which determines whether P[1] is true (the current point is the last point of a stroke). If so, step 172 computes a local feature completely analogous to step 168, except for a different hash function.

If the current point is neither the first nor the last point of a stroke, the system flows to steps 174 and 176, which compute a combination between the X, Y, and curvature membership vector, C. Again, the identities of the local features are computed using a hash function that produces unique numbers for all possible curvature features. The local feature values are computed by combining the X, Y, and C values. Step 174 computes a feature associated with the first non-zero curvature membership function, while step 176 computes a feature associated with the second non-zero curvature membership function. The local feature is then added to the global data structure. The order of execution of 174 and 176 is not important.

Finally, when steps 168, 172, 174, and 176 are all finished, the nested loops are tested and incremented. Step 178 increments the inner Yindex counter. Decision diamond 180 then determines whether the inner loop is finished. If not, the system flows back to step 160 of the flow chart of FIG. 13a. If so, then the outer loop counter, Xindex, is incremented by step 182. Decision diamond 184 determines whether the outer loop is finished. If so, then the system is finished with the current point and the system flows to decision diamond 185. Otherwise, the system flows back to step 158 of the flow chart of FIG. 13a.

Steps 185, 186, 187, 188, and 189 are completely analogous to steps 136, 138, 140, 142, and 144 of FIG. 12. These steps loop over all of the points in every stroke. If more points need to be processed, the system flows back to step 152 of FIG. 13a. Otherwise the flow chart ends at step 186.

The sixth step of the pre-processing, which consists of the integration of local features from each point into a global set of features can be accomplished in two different ways:

As is well known in the prior art, the features can be represented as a non-sparse multi-dimensional array, which is a Cartesian product of membership functions (see FIG. 2 of U.S. Pat. No. 5,337,372 to LeCun et al. or "Neural Networks and Fuzzy Systems", by Kosko, page 328). The size of this global array is exponential with the number of dimensions. Therefore, the amount of memory and the amount of neural network computation necessary in prior art systems quickly becomes undesirable.

In contrast, the present invention uses a data structure which only stores non-zero features. Using a sparse data structure allows quick storage and check for duplicate features. Also, the non-zero features can be quickly enumerated in sorted order for examination by a neural network or other recognizer. The amount of memory and computation in the handwriting recognition system of the present invention thus only scales as the number of non-zero features, not the number of possible features.

The addition of a local feature to the global feature sparse structure is described below. As an optimization, a check is first made to see if the value of the local feature is 0. If it is, it is not inserted into the global data structure, a procedure which acts to save computation time. This optimization does not change the basic invention.

If a particular feature is found in the sparse structure that matches the local feature id, then that global feature's value is updated using the local feature's value. The preferred embodiment adds the local feature value to the global feature, but taking the maximum and other combination functions are also possible.

Addition of local features to the global data structure may be determined by a first process as illustrated in the flow chart of FIG. 14, reproduced below in pseudo-code as follows:

```
if localFeature.val = 0
    end flow chart
Search global sparse structure for feature with id = localFeature.id
If search successful
{
    update found feature value using localFeature.value
        (Preferred embodiment: foundFeature.value +=
            localFeature.value)
}
else
{
    Insert new feature in sparse structure with
        id = localFeature.id, value = localFeature.value
}
```

Various sparse data structures can be used in the above determination. If the number of global features per character is small, it is time-efficient to store the global features in a list. Otherwise, the data structure can be a tree.

Searching and inserting data into trees is well known in the art: see "The Art of Computer Programming" by Donald Knuth, vol. 3, Addison Wesley (1973) or "Algorithms in C++" by Robert Sedgewick, Addison Wesley (1992). Those skilled in the art realize that certain styles of trees have better performance on insertion and are more compact, such as balanced binary trees or AVL trees. See, for example, Sedgewick, pp 215ff.

Figure 14:
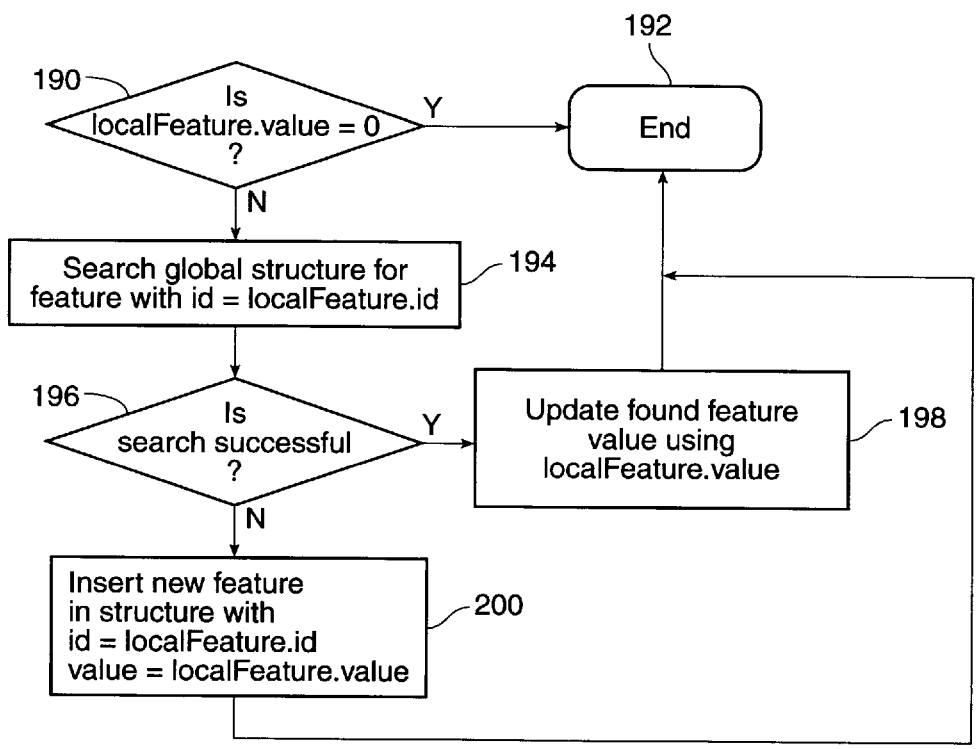
FIG. 14 is a flow chart illustrating the addition of local features to the global data structure according to the present invention.

Turning now to the flow chart of FIG. 14, the process starts at decision diamond 190, which is a check to see if the local feature's value is non-zero. If it is zero (due to underflow in the multiplications in steps 168, 172, 174, or 176 of the flow chart of FIG. 13b, for example), then the system does not need to add the local feature to the global data structure, and hence ends the process at "End" 192. Decision diamond 190 is just an optimization. If the local feature's value is non-zero, control flows to step 194, which searches the global structure for a feature whose id matches the local feature's id. If the global structure is a tree, then the search is a standard tree search. If the global structure is a list, then the search is a standard list search. Decision diamond 196 determines whether the search is successful. If it is, then a global feature with id=localFeature.id already exists and will be updated by step 198. The preferred embodiment of this updating is to add the localFeature's value to the global feature's value. If the local feature's id does not match any global feature's id, then step 200 inserts a new feature in the data structure with id and value the same as the local feature. If the global data structure is a tree, then a well-known tree insertion algorithm is used. If the global data structure is a list, then the feature is added to the beginning of the list. After either step 198 or 200 is performed, the process shown in the flow chart of FIG. 14 is finished at "End" 192.

As disclosed below, it is preferred that the global features be sorted into a plurality of global sub-structures, in order to limit the amount of hidden weights in memory at the same time. A modification of the determination disclosed in FIG. 14 may be used to produce a plurality of global sub-structures, instead of one global structure. This process is illustrated in the flow chart of FIG. 15 and reproduced below as pseudo-code:

```
if localFeature.val == 0
    end flow chart
N = localFeature.id/numFeaturesPerSubStructure
Search global sub-structure number N for feature with id = localFeature.id
If search successful
    {
    update found feature value using localFeature.value
        (Preferred embodiment: foundFeature.value +=
        localFeature.value)
    }
else
    {
    Insert new feature in sub-structure N with
        id = localFeature.id, value = localFeature.value
    }
```

In the above algorithm, the number N indicates which sub-structure the local feature should fall into. In the preferred embodiment, N=localFeature.id/100, which produces 5 sub-structures from 500 possible features. Each of the five sub-structures is a sparse data structure. If the number of features per sub-structure is small, the structure may be a list, otherwise, the structure may be a tree.

Figure 15:
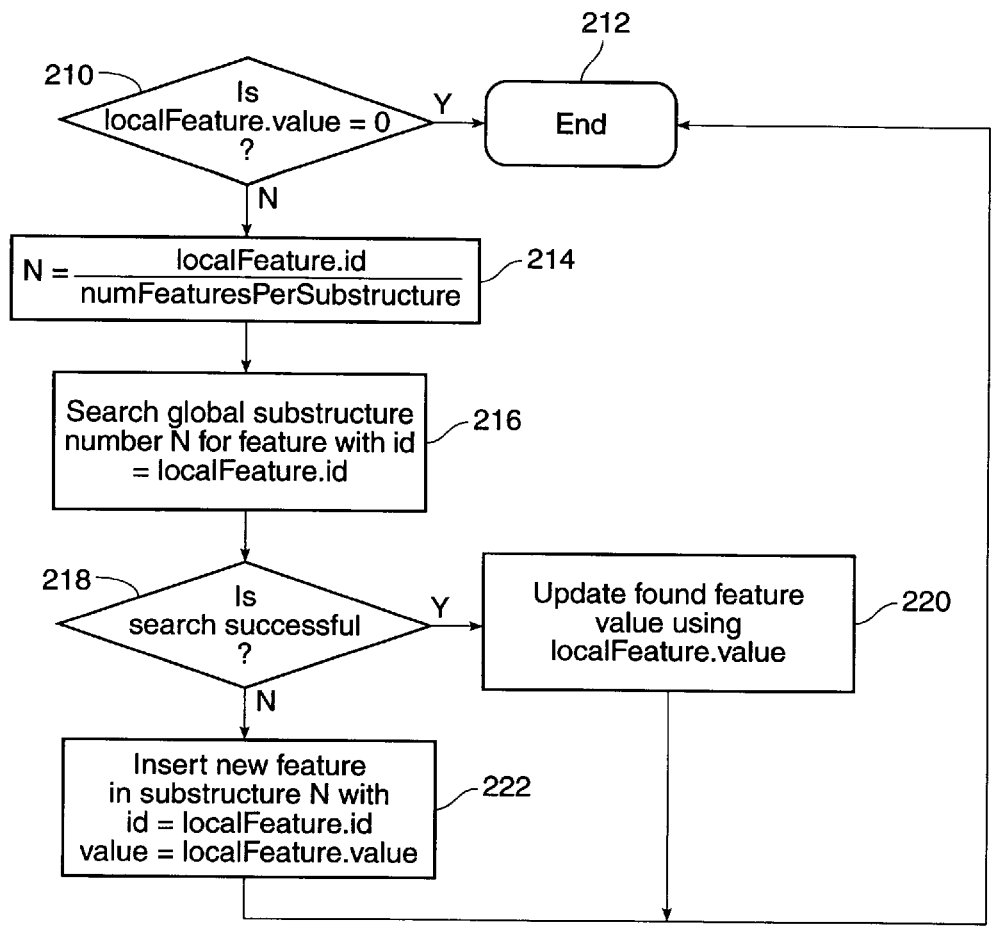
FIG. 15 is a flow chart illustrating a process for the addition of local features to a set of global data structures according to a preferred embodiment of the present invention.

The local feature determination process of FIG. 15 starts with decision diamond 210, which is analogous to decision diamond 190 of the flow chart of FIG. 13. If the value of the local feature is zero, the process terminates at "End" 212. If the value of the local feature is non-zero, the system flows to step 214, which computes N, which is the global sub-structure that the local feature falls into. In other words, step 214 computes a hashing code for the local feature. Steps 216, 218, 220, and 222 are then completely analogous to steps 194, 196, 198, and 200, respectively, of the flow chart of FIG. 14, except that all of the searching and insertion is performed on a global sub-structure, not on the entire global structure.

The sparse data feature structure developed for each character is then processed by a neural network. The neural network operates on one character at a time. As input, it accepts the sparse global data structure. For output, it produces a confidence in [0,1] for every character in the character set. In a handwriting system actually constructed according to the teachings of the present invention, a neural network has 72 outputs, one for every upper case character A–Z, one for every lower case character a–z, one for every digit 0–9, and one for each punctuation currently recognized: !$ & –=: ; ', ? This character set is illustrative only and those of ordinary skill in the art will appreciate that the scope of the present invention is of course not limited to any particular character set.

Figure 16:
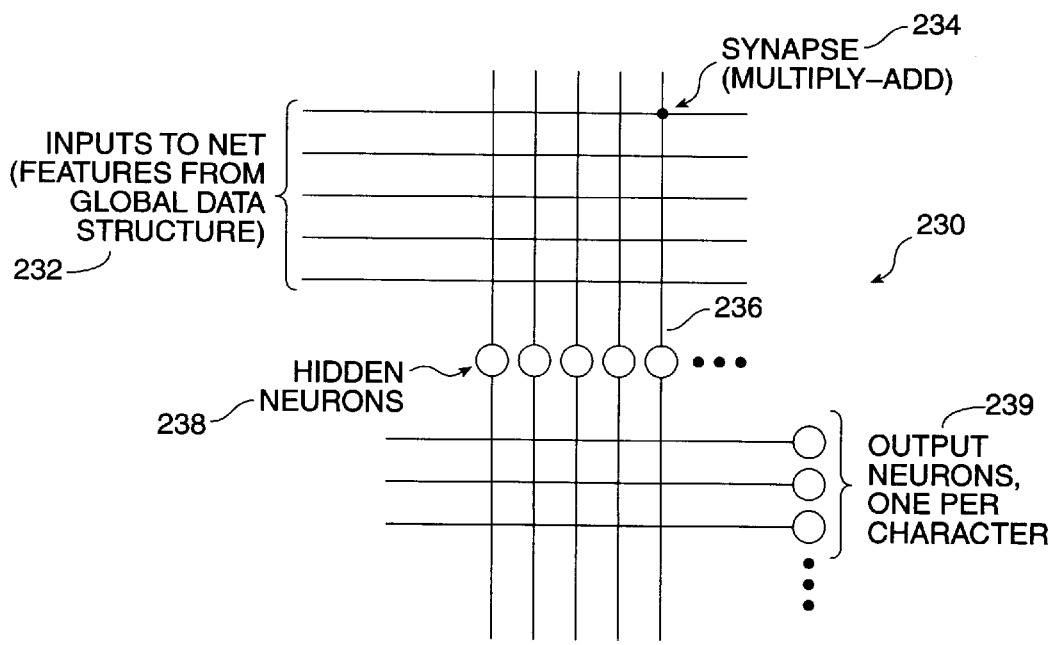
FIG. 16 is a diagram of a neural network employed in an actual embodiment of a handwriting recognition system configured according to the present invention.

The neural network employed in the actual embodiment of a handwriting recognition system configured according to the present invention is a standard multi-layer perception, with sigmoidal non-linearities as shown in FIG. 16. Those skilled in the art will understand how to train such a network using back-propagation and implement such a network on a standard digital processor. Although FIG. 16 shows a network with a single hidden layer, those of ordinary skill on the art will appreciate that the present invention is not limited to employment of a neural network having only one hidden layer. Nor is the handwriting recognition system of the present invention limited to neural networks with sigmoidal non-linearities. For example, neural networks having Gaussian non-linearities could be employed in the present invention.

Referring now to FIG. 16, neural network 230 takes a set of inputs 232. In this invention, the inputs come from the sparse data structure, which only represents the non-zero inputs. In the neural 230 network illustrated in FIG. 16, the inputs are communicated over the horizontal lines. Each intersection of the horizontal and vertical lines is a synapse, 234. Each synapse 234 has a stored weight. The synapse 234 multiplies the stored weight by the input and sends the product in to be summed along the vertical lines, 236. All of the results of the synapses 234 along a vertical line 236 are summed. The vector of these sums is mathematically equivalent to multiplying the weight matrix by the vector of inputs.

The hidden units, 238, apply a non-linearity to each sum. In the preferred embodiment, the non-linearity is sigmoidal. Part of the disclosure of the present invention deals with only performing the synapse computations for inputs that are non-zero. Zero inputs do not contribute to the sums. In a multiple layer neural network, as shown at reference numeral 230, the outputs of a hidden layer are the inputs to the next layer, which computes a similar matrix-vector product. The output units then apply a non-linearity to the vector of sums. A vector of outputs 239 are the result of the neural network 230.

Further details on the use and training of neural networks are well known in the art and can be found in the book "Introduction to the Theory of Neural Computation," by J.

Hertz, A. Krogh, and R. Palmer, published by Addison Wesley (1991).

According to the present invention, a standard multi-layer perception, rather than a convolutional neural network, is explicitly used. The use of a convolutional neural network in combination with a multi-dimensional feature space for handwriting recognition is known in the prior art and such an arrangement is described in Bengio, LeCun, Henderson, "Globally Trained Handwritten Word Recognizer using Spatial Representation, Convolutional Neural Networks, and Hidden Markov Models."

A simpler multi-layer perception is used according to the present invention, because the number of computations per free parameter is much lower for a multi-layer perception than for a convolutional network. For a network trained with a large amount of data, the multi-layer perception is substantially faster. Also, a standard multi-layer network can take advantage of a sparse input data structure.

For the 72 output neurons, a network with two layers of trainable weights and 200 hidden neurons was found to be optimal. A hyperbolic tangent ("tanh") non-linearity is used for the hidden layer neurons and a [0,1] sigmoidal non-linearity is used for the output neurons. Those skilled in the art will appreciate that standard statistical techniques, such as a validation set or cross-validation, may be used to determine the optimal network size for any particular database.

Because the input to the network is sparse, special code that saves computation may be used in the first layer of the multi-layer perception. An example of such a code is shown in the flow chart of FIG. 17 and is also reproduced below as pseudo-code:

```
Let numHidden = number of hidden units in network
Let input = vector of inputs
Let hidden = vector of hidden unit values
Let hiddenWeight = matrix of weights connecting inputs to hidden units
Let threshold = vector of thresholds for the hidden units
set hidden vector to zero
Loop over every non-zero global feature
{
  for (i = 0; i < numHidden; i++)
    hidden[i] += hiddenWeight[globalFeature.id][i]*globalFeature.value
}
for (i = 0; i < numHidden; i++)
  hidden[i] = tanh(hidden[i]-threshold[i])
```

Figure 17:
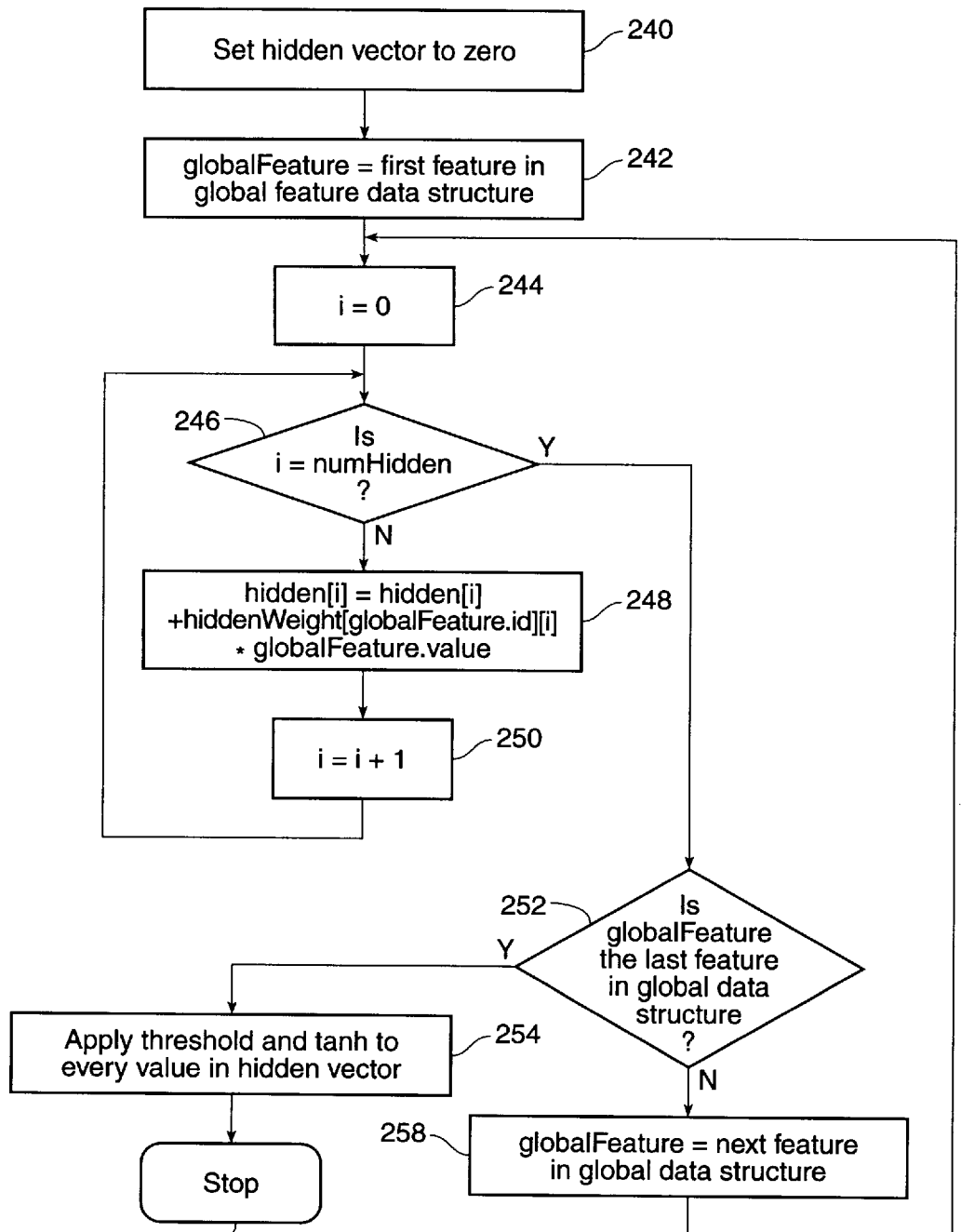
FIG. 17 is a flow chart illustrating the application of the first layer of a neural network to the global data structure according to the present invention.

If the global feature data structure is a tree, then the loop in FIG. 17 performs tree traversal. If the global feature data structure is a list, then the loop performs list traversal. These traversal algorithms are well known to those of ordinary skill in the art.

Those skilled in the art will also realize that using a table lookup for the neural network non-linearities speeds up the computation.

The flow chart of FIG. 17 starts with step 240, where the vector of hidden values of the neural network is set to zero. Step 242 then initializes the loop by choosing the first feature in the global structure, in whatever traversal order and method is convenient. Step 244 then initializes a counter, i, which loops over the hidden neurons. Decision diamond 246 then determines whether the loop is over the hidden neurons is finished. If the loop is not finished, the ith hidden neuron value is incremented by an amount that is the global feature's value multiplied by the corresponding weight in the first layer in step 248. Step 250 then increments the counter i and the system returns to decision diamond 246.

If decision diamond 246 determines that the loop over the hidden values is over, then the system flows to decision diamond 252, which checks to see if the current global feature is the last global feature in the global data structure. If so, then step 254 applies a threshold and a non-linearity to all of the accumulated hidden neuron values, and the process illustrated in the flow chart of FIG. 17 is finished at "End" 256. Otherwise, step 258 finds the next global feature, through the appropriate and customary list or tree traversal algorithm. The system then flows back to step 244.

According to a preferred embodiment of the present invention, the hidden layer requires 500*200=100,000 weights. The weights are stored as 8-bit two's-complement bytes. For example, a stored value of 127 represents a weight of 1.0.

Even stored as bytes, 100 kilobytes may be too large to fit in the memory of an inexpensive processor. Therefore, only a portion of the hidden weights can be loaded into memory from permanent storage, as shown in the flow chart of FIG. 18. These weight portions are referred to herein as "chunks". Each of the weight chunks correspond to features that can be stored in each of the sparse global sub-structures. In the code, baseInputNumber is the lowest feature number that can be stored in the current global sub-structure. Again, the second innermost loop performs either list or tree traversal, depending on the data structure used.

Figure 18:
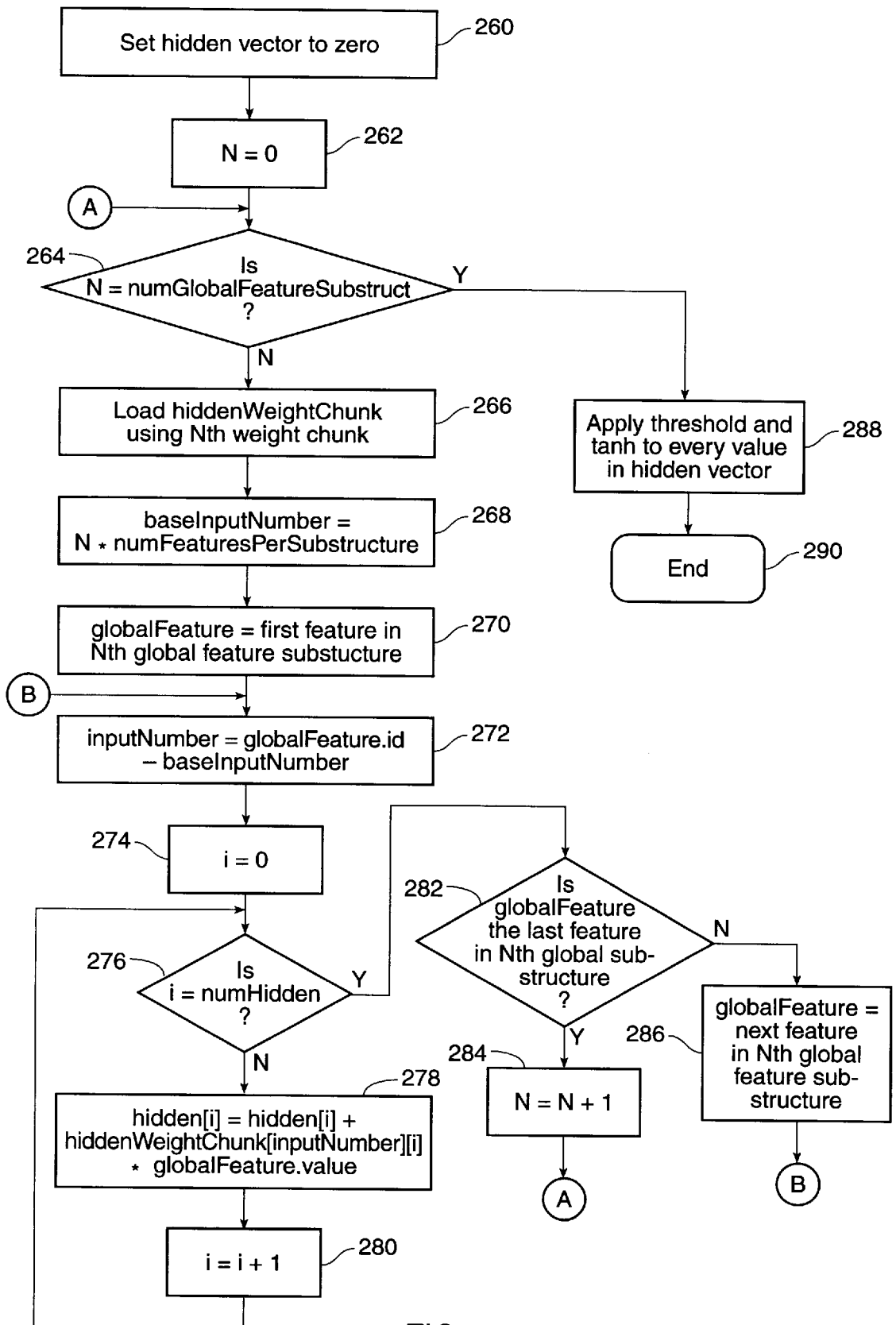
FIG. 18 is a flow chart illustrating a preferred embodiment of the application of the first layer of a neural network to a set of global data structures according to the present invention.

The flow chart of FIG. 18 is also presented below as pseudo-code. Those of ordinary skill in the art will note that hiddenWeightChunk is a partial matrix

```
set hidden vector to zero
for (N = 0; N < numGlobalFeatureSubStruct; N++)
{
  load hiddenWeightChunk corresponding to Nth global feature
    sub-structure
  baseInputNumber = N*numFeaturesPerSubStruct
  loop over every feature in Nth global feature sub-structure
  {
    inputNumber = globalFeature.id - baseInputNumber
    for (i = 0; i < numHidden; i++)
      hidden[i] += hiddenWeightChunk[inputNumber][i]
        *globalFeature.value
  }
}
for (i = 0; i < numHidden; i++)
  hidden[i] = tanh(hidden[i]-threshold[i])
``` of weights connected to the inputs:

Referring now to FIG. 18, the process starts at step 260, where the vector of hidden values of the neural network is set to zero. Step 262 then initializes a loop counter, N, which loops over the all of the global sub-structures. Decision diamond 264 then checks to see if the loop over all of the global sub-structures is finished. If not, control flows to step 266, which loads the set of hidden weights that corresponds to the Nth weight chunk. The exact method of loading depends on the operating system, but techniques for loading data from permanent storage are well known in the art. Each weight chunk connects a range of neural network inputs to all of the hidden neurons. Step 268 computes the lowest neural network input number that the Nth weight chunk connects to. Step 270 then initializes a loop over the Nth global feature sub-structure, in whatever traversal order and method is convenient. Step 272 computes an index, inputNumber, which maps the current global feature identity to an input in the current weight chunk. Steps 274, 276, and 280 are then completely analogous to steps 244, 246, and 250 of the process of FIG. 17. Step 278 is similar to step 248 of FIG. 17, except that the index into the weight chunk is inputNumber, not the global feature's identity. If decision diamond 282 determines that the current global feature is the last feature in the Nth sub-structure, then step 284 advances the sub-structure counter and control flows back to decision diamond 264. Otherwise, the global feature is set to the next feature in the Nth global sub-structure at step 286, using well-known list or tree traversal methods. Control then flows back to step 272.

If decision diamond 264 determines that there are no more global feature sub-structures, then step 288 applies the threshold and a non-linearity to all of the stored hidden neuron values. The process of the flow chart of FIG. 18 is then finished at "End" 290.

Figure 19:
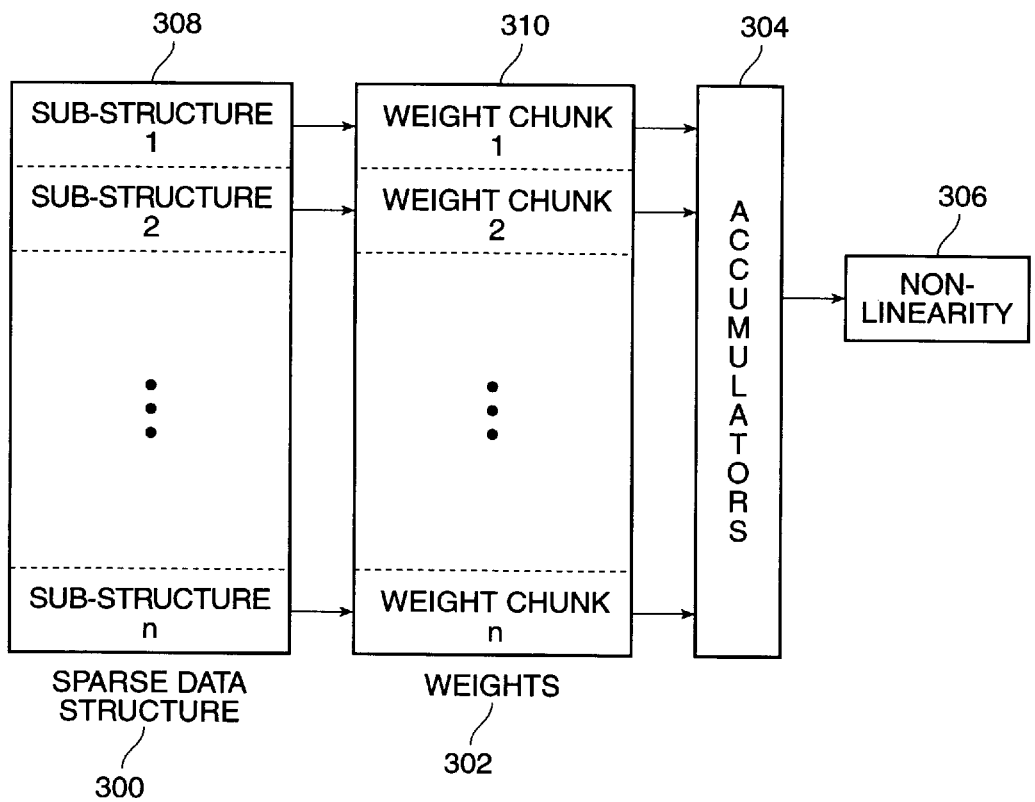
FIG. 19 is a diagram of the first layer of a neural network operating on a sparse global data structure.

The machinery to perform the processes shown in FIGS. 17 and 18 is shown in FIG. 19. The sparse data structure, 300, is supplied to the weights, 302. These weights are then multiplied by the non-zero elements of the sparse data structure and the terms are then accumulated in the accumulators, 304. A non-linearity, 306, is then applied to all the values in the accumulators. In FIG. 18, the sparse data structure 300 consists of a set of sub-structures, 308. Each sub-structure is supplied to a weight chunk, 310, which is a subset of the weights.

A neural network is used in the present invention as a recognizer that exploits the sparseness of the data structure. However, any statistical classifier whose first layer or front-end performs a vector-matrix multiply can be used as the recognizer in the system of the present invention. For example, researchers have proposed using a neural network/nearest neighbor hybrid (see Guyon, Henderson, et al., "Writer Independent and Writer Adaptive Neural Network for Online Character Recognition" in From Pixels to Features III: Frontiers in Handwriting Recognition, Elsevier Science Publishers (1992)). Other researchers suggest using principle components analysis before a statistical classifier (see Leen, Rudnick, and Hammerstrom, "Hessian Feature Discovery Improves Classifier Efficiency," Proceedings of the IEEE/INNS International Joint Conference on Neural Networks (1990) pp. I-51-I-56). Other examples may suggest themselves to persons of ordinary skill in the art.

Figure 20:
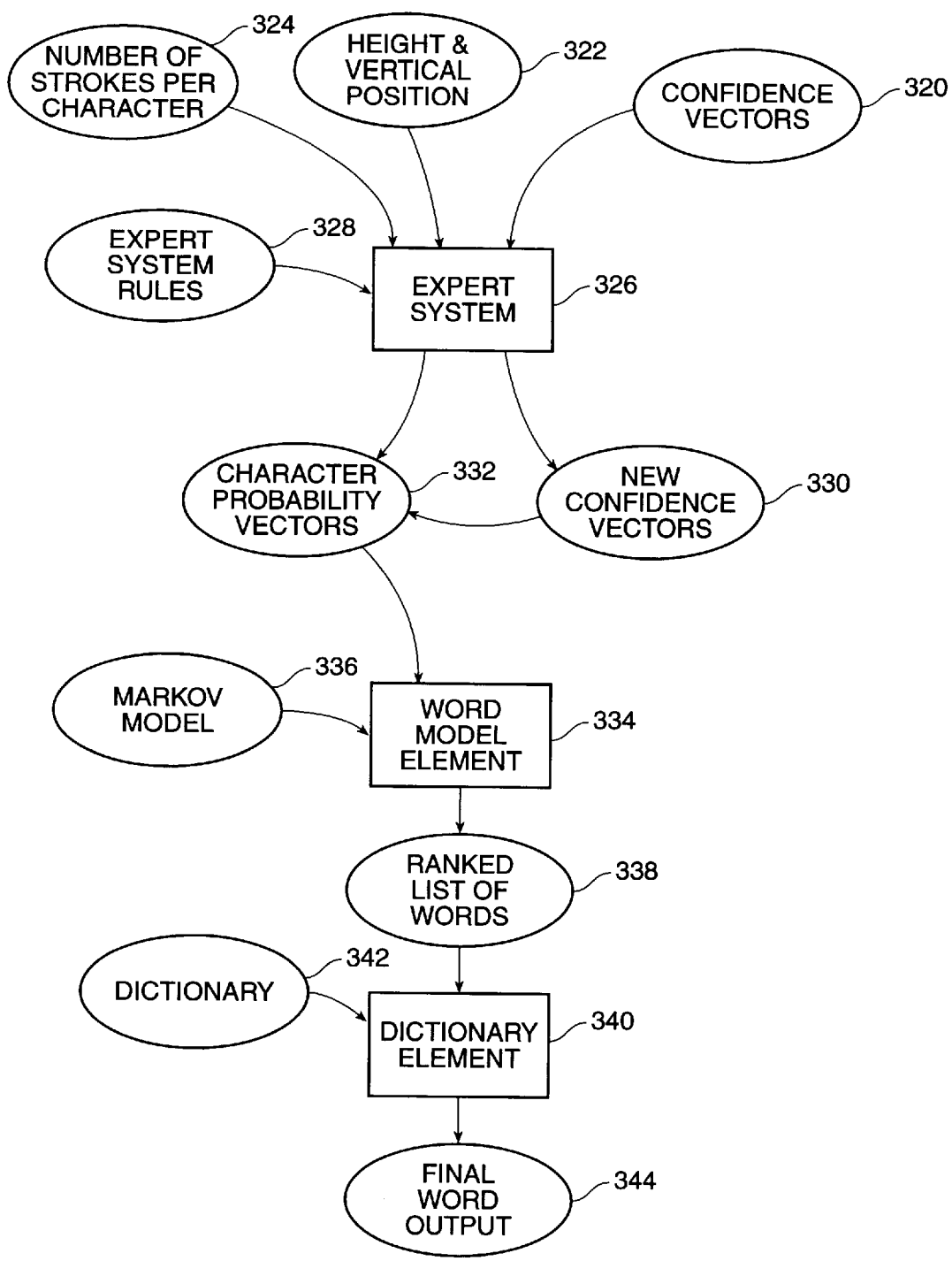
FIG. 20 is a data flow chart of a process used by the post processing unit.

Referring now to FIG. 20, a data flow chart of a process used by the post processing unit 22 (FIG. 1) is described. In the following description, a preferred embodiment of the invention is described with regard to preferred process steps and data structures. However, those skilled in the art would recognize, after perusal of this application, that embodiments of the invention may be implemented using a set of general purpose computers operating under program control, and that modification of a set of general purpose computers to implement the process steps and data structures described herein would not require undue invention.

According to a preferred embodiment of the present invention, the neural network (FIG. 16) produces a set of confidence vectors 320, one confidence vector for each handwritten character coupled to the neural network. Each confidence vector itself comprises a sequence of scalar confidence values. There is one scalar confidence value for each possible character symbol which might correspond to the handwritten character in that character position. Thus, for example, for a sequence of four handwritten characters, the neural network would generate a set of four confidence vectors 320, each of which comprises a sequence of 72 scalar confidence values. The first confidence vector 320 would comprise, e.g., the confidence that the first handwritten character should be interpreted as the character "A", the confidence that the first handwritten character should be interpreted as the character "B", and so on. Similarly, the second confidence vector 320 would comprise the confidence that the second handwritten character should be interpreted as the character "A", and so on. Other confidence vectors 320 have similar structures.

The confidence vectors 320, the height and vertical position 322 for each character, and the number of strokes per character 324 are coupled to an expert system 326. The expert system 326 is coupled to a set of expert system rules 328 and operates on the confidence vectors 320 according to that set of rules 328. In a presently preferred embodiment, each rule in the set 328 is applied to the confidence vector 320 until the set of rules 328 is exhausted. Although in this preferred embodiment the operation of the expert system 326 is simple, in alternative embodiments, the expert system 326 may operate according to a more general expert system rule-based reasoning technique. The generic concept of expert systems is known in the art, and is further described for example in Principles of Artificial Intelligence, Nils J. Nilsson, published by Morgan Kaufman.

The expert system's set of rules 328 comprise rules which use information about the height, vertical position, and number of strokes of the character to adjust the confidence vectors 320 output from the neural network. In a preferred embodiment, these rules 328 comprise common-sense facts about handwriting and about the English language (or another language for which the handwriting recognizer is intended to operate). Those skilled in the art would recognize a large variety of such rules 328 after perusal of this application. Some examples of such rules include the rules in the following Table 2.

TABLE 2 o   If the character is very small, increase the period confidence and decrease the confidence of the other characters.
o   If the bottom of the character is relatively high in the grid, decrease the confidence of the comma, 1, L, I, and i.
o   If the bottom of the character is relatively low in the grid, decrease the confidence of the apostrophe.
o   If the bottom of the character is below the baseline, increase the confidence of characters with descenders.
o   If the character has only one stroke, decrease the confidence of the equals sign.
o   If the character is the last character in the word, and the j confidence is large, decrease the j confidence and increase the semicolon confidence.
o   If the height of the first character is much larger than the rest, then increase the confidence of the first character of capital letters and characters with ascenders. Also, increase the confidence of the characters beyond the first character, for lower case classes with neither ascenders nor descenders.
o   If a character's height is small relative to the rest of the characters, and the L, 1, or I confidence is large, then decrease the L, 1, and I confidence and increase the i and apostrophe confidence.

The expert system 326 generates a set of new confidence vectors 330 for each character position, having like structure to the confidence vectors 320, and a character probability vector 332 for each character position corresponding to the new confidence vector 330 for that character position. In a preferred embodiment, each character probability vector 332 comprises a set of scalar character probabilities, each of which is proportional to the corresponding scalar confidence value in the corresponding new confidence vector 330, but normalized so that the scalar character probabilities sum to one for an entire character position. The normalization simply divides each confidence vector 330 by the sum of the scalar confidences in each confidence vector 330. However, in alternative embodiments, other known techniques to convert network outputs to probabilities could be used, such as those shown in Denker and le Cun, "Transforming Neural-Net Output Levels to Probability Distributions," appearing in Advances in Neural Information Processing Systems, volume 3, 1991, published by Morgan Kaufman.

The set of character probabilities 332 are coupled to a word model element 334. The word model element 334 is coupled to a Markov model 336 of character N-gram (N letter sequence) probabilities found in words, such as probabilities for bigrams (two letter sequences) and probabilities for trigrams (three letter sequences). The word model element 334 examines the set of character probabilities 332, and determines a ranked list 338 of word candidates.

This list of possible output words may be generated by known techniques, such as a beam search, as described in B. Lowerre, "The Harpy Speech Understanding System" (appearing in Readings in Speech Recognition, edited by Waibel and Lee, published by Morgan Kaufmann 1990), a modified Viterbi technique as described in Shingal, "A Hybrid Algorithm for Contextual Text Recognition" (appearing in the journal Pattern Recognition, vol. 16, no. 2, pages 261–267, 1983), or a pruned depth-first search as described in D. Knuth, The Art Of Computer Programming (vol. 3: Sorting and Searching) (published by Addison-Wesley), e.g., at page 492.

In the preferred embodiment, the word model element 334 uses Bayes's rule to combine the character probabilities 332 with the Markov model 336 of character N-gram probabilities, to yield an a posteriori probability for each word in a list of possible output words. This combination is described in detail in the paper by Shingal, cited above. Those skilled in the art will recognize that the a posteriori probability is proportional to the product of the a priori probabilities and the character probabilities 332. For ease of computation, all of these probabilities are expressed in logarithmic form, so that core computations of the word model comprise addition.

The ranked list 338 of word candidates is coupled to a dictionary element 340. The dictionary element 340 is coupled to a dictionary of known words 342 and operates on the ranked list 338 of word candidates to produce a final word output 344. In a preferred embodiment, the dictionary element 340 uses a known dictionary search technique to determine if a word in the ranked list 338 of word candidates is in, or sufficiently close to, any word in the dictionary of known words 332. Some of these dictionary search techniques are further described in D. Knuth, The Art Of Computer Programming (vol. 3: Sorting and Searching) (published by Addison-Wesley).

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. Apparatus for supplying data to a handwritten character recognizer system comprising:

means for detecting character strokes in real-time as they are being made, the character strokes comprising positional and temporal information derived from the motion of an object contacting, moving across, and leaving the surface of an input device;

means for segmenting said character strokes into individual characters;

means for measuring stroke geometry at a plurality of points of ones of said character strokes comprising individual characters;

means for producing sparse fuzzy membership vectors into features;

means for combining said sparse fuzzy membership vectors into features;

means for collecting said features into a sparse data structure; and means for supplying said sparse data structure to a handwriting recognition system, said apparatus being capable of determining the character before all strokes in the character are detected.

2. The apparatus of claim 1 wherein said means for measuring stroke geometry at a plurality of points of ones of said character strokes comprising individual characters comprises:

means for scaling strokes comprising characters to produce scaled strokes;

means for re-sampling said scaled strokes to produce a plurality of points of re-sampled data; and means for measuring geometry of said plurality of points of said re-sampled data.

3. The apparatus of claim 2 wherein said means for measuring geometry at a plurality of points of said re-sampled data comprises:

means for determining a penup point containing positional and temporal information derived from said stylus contacting said tablet input device and a pen-down point containing temporal and positional information derived from said stylus leaving said tablet input device of said re-sampled data for each of said strokes;

means for measuring x and y position at a plurality of points of said re-sampled data of said strokes;

means for measuring curvature at a plurality of points of said re-sampled data of said strokes; and means for measuring stroke direction at a plurality of points of said re-sampled data of said strokes.

4. The apparatus of claim 3 wherein said means for measuring stroke direction at a plurality of points of said re-sampled data of said strokes encodes stroke direction over a 360° range.

5. The apparatus of claim 1 wherein said means for combining said sparse fuzzy membership vectors into features comprises means for combining a subset of said sparse membership vectors.

6. The apparatus of claim 5 wherein said subset comprises a first subset consisting of x and y position and curvature, a second subset consisting of x and y position and direction, and a third subset consisting of x and y position and penup/pendown.

7. The apparatus of claim 1 wherein said sparse fuzzy membership vectors consist of identities and values for at least two non-zero membership functions.

8. The apparatus of claim 7 wherein said sparse fuzzy membership vectors consist of identities and values for two non-zero membership functions.

9. The apparatus of claim 1 wherein said means for combining said sparse fuzzy membership vectors into features comprises:
   means for assigning a unique identity to each of said features based on identities of its individual sparse membership vectors; and
   generating a value for each said feature by multiplying the values of its individual sparse membership vectors.

10. The apparatus of claim 1 further including means for producing binary pointwise variables from individual points of said stroke geometry and wherein said means for combining said sparse fuzzy membership vectors into features includes means for combining said binary pointwise variables into said sparse data structure.

11. A handwritten character recognizer system for recognizing individual characters from a character set comprising:
   means for detecting character strokes in real-time as they are being written;
   means for segmenting said character strokes into individual characters;
   means for measuring stroke geometry at a plurality of points of ones of said character strokes comprising individual characters;
   means for producing sparse fuzzy membership vectors representing said stroke geometry of a plurality of points of ones of said character strokes comprising individual characters;
   means for combining said sparse fuzzy membership vectors into features;
   means for collecting said features into a sparse data structure; and
   a statistical classifier system having inputs for receiving said sparse data structure and outputs, said system being capable of determining the character before all strokes in the character are detected.

12. The handwritten character recognizer system of claim 11 wherein said statistical classifier comprises a neural network having inputs for receiving non-zero data from said sparse data structure and having an output comprising a signal representing a level of confidence for each character in said character set.

13. The handwritten character recognizer system of claim 12 wherein said neural network is non-convolutional.

14. The handwritten character recognizer system of claim 11 wherein said means for measuring stroke geometry at a plurality of points of ones of said character strokes comprising individual characters comprises:
   means for scaling strokes comprising characters to produce scaled strokes;
   means for re-sampling said scaled strokes at a plurality of points to produce re-sampled data; and
   means for measuring geometry of said re-sampled data at said plurality of points.

15. The handwritten character recognizer system of claim 14 wherein said means for measuring geometry of said re-sampled data at said plurality of points comprises:
   means for determining penup and pendown points of said re-sampled data of said strokes;
   means for measuring x and y position of said re-sampled data of said strokes at said plurality of points;
   means for measuring curvature of said re-sampled data of said strokes at said plurality of points; and
   means for measuring stroke direction of said re-sampled data of said strokes at said plurality of points.

16. The handwritten character recognizer system of claim 15 wherein said means for measuring stroke direction at a plurality of points of said re-sampled data of said strokes encodes stroke direction over a 360° range.

17. The handwritten character recognizer system of claim 11 wherein said means for combining said sparse fuzzy membership vectors into features comprises means for combining a subset of said sparse membership vectors.

18. The handwritten character recognizer system of claim 17 wherein said subset comprises a first subset consisting of x and y position and curvature, a second subset consisting x and y position and direction, and a third subset consisting x and y position and penup/pendown.

19. The handwritten character recognizer system of claim 11 wherein said sparse fuzzy membership vectors comprise identities and values for at least two non-zero membership functions.

20. The handwritten character recognizer system of claim 19 wherein said sparse fuzzy membership vectors comprise identities and values for two non-zero membership functions.

21. The handwritten character recognizer system of claim 11 wherein said means for combining said sparse fuzzy membership vectors into features comprises:
   means for assigning a unique identity to each of said features based on identities of its individual sparse membership vectors; and
   generating a value for each said feature by multiplying the values of its individual sparse membership vectors.

22. The handwritten character recognizer system of claim 11 further including means for producing binary pointwise variables from said stroke geometry and wherein said means for combining said sparse fuzzy membership vectors into features includes means for combining said binary pointwise variables into said sparse data structure.

23. A system for recognizing handwritten characters having a plurality of strokes detected in real-time as they are being written, said system comprising a statistical classifier, said statistical classifier comprising:
   a set of chunks, each said chunk comprising a set of weights;
   an input port coupled to a sparse data structure, said sparse data structure comprising a set of substructures corresponding to said set of chunks;
   means for applying said weights in one said chunk to a corresponding substructure in said sparse data structure and to generate a set of terms; and
   an accumulator coupled to said terms, said system being capable of determining the character before all strokes in the character are detected.

24. A system as in claim 23, wherein each said substructure comprises a set of features, each said feature comprising an identifier for a datum and a value for said datum.

25. A system as in claim 23, wherein each said substructure comprises a graph structure, a hash table, a linked list, an ordered list, or a tree structure.

26. A system as in claim 23,
   wherein each said substructure comprises a set of data identifiers and data values; and
   wherein said means for applying is disposed to generate said set of terms responsive only to said data values corresponding to said data identifiers.

27. A system as in claim 23, wherein said means for applying comprises a neural network, and said weights comprise neural weights.

28. A system as in claim 23, wherein said means for applying comprises a nonlinear element.

29. A system as in claim 23, wherein said means for applying comprises means for multiplying a vector represented by at least one said substructure of said sparse data structure by a matrix represented by said at least one said chunk.

30. A system as in claim 23, wherein said means for applying comprises:

means for loading at least one said chunk into a memory; and means for multiplying a vector represented by at least one said substructure of said sparse data structure by a matrix represented by said at least one said chunk.

31. A system as in claim 23, wherein said means for applying comprises:

an index variable representing at least one said chunk;

a memory comprising at least one said chunk indicated by said index variable; and a processor disposed to multiply a vector represented by at least one said substructure of said sparse data structure by a matrix represented by a set of neural weights in said memory, said processor being disposed to store a set of results of said multiply in said accumulator;

wherein said processor is disposed to increment said index variable until a predetermined condition is met.

32. A system as in claim 23, comprising a nonlinear transfer function coupled to said accumulator.

33. A system as in claim 23, comprising a postprocessor coupled to said statistical classifier and disposed to alter a set of confidence values output therefrom.

34. A system for recognizing handwritten characters having a plurality of strokes detected in real-time as they are being written, said system comprising a statistical classifier, said statistical classifier comprising:

an input port coupled to a sparse data structure, said sparse data structure comprising a set of pairs of data identifiers and data values; and means for applying a set of weights only to said data values corresponding to said data identifiers, said system being capable of determining the character before all strokes are detected.

35. A system as in claim 34, wherein said means for applying comprises a neural network, and said weights comprise neural weights.

36. A system as in claim 34, wherein said means for applying comprises a nonlinear element.

37. A system as in claim 34, wherein said means for applying comprises means for multiplying a vector represented by at least one said substructure of said sparse data structure by a matrix represented by said at least one said chunk.

38. A system as in claim 34, comprising a postprocessor coupled to said statistical classifier and disposed to alter a set of confidence values output therefrom.

39. A system for recognizing handwritten characters detected in real-time as they are being written, said system comprising:

first apparatus disposed to receive said handwritten character;

a preprocessor coupled to said first apparatus and disposed to generate a set of fuzzy membership values;

second apparatus coupled to said fuzzy membership values and disposed to generate a set of feature pairs of data identifiers and data values in response thereto; and a statistical classifier coupled to said feature pairs and disposed to apply a set of weights only to said data values corresponding to said data identifiers, said system being capable of determining the character before all strokes in the character are detected.

40. A system as in claim 39, wherein said statistical classifier comprises:

a set of chunks, each said chunk comprising at least one of said set of weights;

an input port coupled to a sparse data structure, said sparse data structure comprising a set of substructures corresponding to said set of chunks;

means for applying said weights in one said chunk to a corresponding substructure in said sparse data structure and to generate a set of terms; and an accumulator coupled to said terms.

41. A system as in claim 40, wherein each said substructure comprises a set of features, each said feature comprising an identifier for a datum and a value for said datum.

42. A system as in claim 40, wherein each said substructure comprises a graph structure, a hash table, a linked list, an ordered list, or a tree structure.

43. A system as in claim 40, wherein each said substructure comprises a set of data identifiers and data values; and wherein said means for applying is disposed to generate said set of terms responsive only to said data values corresponding to said data identifiers.

44. A system as in claim 40, wherein said means for applying comprises a neural network, and said weights comprise neural weights.

45. A system as in claim 40, wherein said means for applying comprises a nonlinear element.

46. A system as in claim 40, wherein said means for applying comprises means for multiplying a vector represented by at least one said substructure of said sparse data structure by a matrix represented by said at least one said chunk.

47. A system as in claim 40, wherein said means for applying comprises:

means for loading at least one said chunk into a memory; and means for multiplying a vector represented by at least one said substructure of said sparse data structure by a matrix represented by said at least one said chunk.

48. A system as in claim 40, wherein said means for applying comprises:

an index variable representing at least one said chunk;

a memory comprising at least one said chunk indicated by said index variable; and a processor disposed to multiply a vector represented by at least one said substructure of said sparse data structure by a matrix represented by a set of neural weights in said memory, said processor being disposed to store a set of results of said multiply in said accumulator;

wherein said processor is disposed to increment said index variable until a predetermined condition is met.

49. A system as in claim 40, wherein said means for applying comprises a nonlinear transfer function coupled to said accumulator.

50. A system as in claim 39, wherein said statistical classifier comprises:

an input port coupled to a sparse data structure, said sparse data structure comprising a set of pairs of data identifiers and data values;

a neural network having a set of neural weights and disposed to apply said neural weights only to said data values corresponding to said data identifiers.

51. A system as in claim 39, wherein:

said pre-processor is disposed to generate a set of binary pointwise values;

said second apparatus is coupled to said binary pointwise values and is disposed to generate said set of feature pairs responsive to said binary pointwise values.

52. A system as in claim 39, further comprising a post-processor coupled to said statistical classifier and disposed to alter a set of confidence values output therefrom.

53. Apparatus for supplying data to a handwritten recognizer system comprising:

a detector for detecting character strokes in real-time as they are being made;

a segmenting device for segmenting said character strokes into individual characters;

a measuring device for measuring stroke geometry at a plurality of points of ones of said character strokes comprising individual characters;

a device for producing sparse fuzzy membership vectors into features;

a combining device for combining said sparse fuzzy membership vectors into features;

a collector for collecting said features into a sparse data structure; and a supplier for supplying said sparse data structure to a handwritten recognition system, said apparatus being capable of determining the character before all strokes in the character are detected.

54. The apparatus of claim 53 wherein the character strokes comprise positional and temporal information derived from the motion of an object.

55. The apparatus of claim 54 wherein the object comprises a stylus.

56. The apparatus of claim 54 wherein the object contacts, moves across and leaves the surface of an input device.

57. The apparatus of claim 56 wherein the input device comprises a tablet.

58. The apparatus of claim 54 wherein the positional and temporal information comprises starting, moving, and stopping the motion of the object on a surface.

59. A handwritten character recognizer system for recognizing individual characters from a character set comprising:

a detector for detecting character strokes in real-time as they are being made;

a segmenting device for segmenting said character strokes into individual characters;

a measurement device for measuring stroke geometry at a plurality of points of ones of said character strokes comprising individual characters;

a producing device for producing sparse fuzzy membership vectors representing said stroke geometry of a plurality of points of ones of said character strokes comprising individual characters;

a combiner for combining said sparse fuzzy membership vectors into features;

a collector for collecting said features into a sparse data structure; and a statistical classifier system having inputs for receiving said sparse data structure and outputs, said system being capable of determining the character before all strokes in the character are detected.

60. A system for recognizing handwritten characters having a plurality of strokes detected in real-time as they are being made, said system comprising a statistical classifier, said statistical classifier comprising:

a set of chunks, each said chunk comprising a set of weights;

an input port coupled to a sparse data structure, said sparse data structure comprising a set of substructures corresponding to said set of chunks;

an applying device for applying said weights in one said chunk to a corresponding substructure in said sparse data structure and to generate a set of terms; and an accumulator coupled to said terms, said system being capable of determining the character before all strokes in the character are detected.

61. A system for recognizing handwritten characters having a plurality of strokes detected in real-time as they are being made, said system comprising a statistical classifier, said statistical classifier comprising:

an input port coupled to a sparse data structure, said sparse data structure comprising a set of pairs of data identifiers and data values; and an applying device for applying a set of weights only to said data values corresponding to said data identifiers, said system being capable of determining the character before all strokes in the character are detected.

62. The apparatus of claim 1 wherein the object comprises a stylus.

63. The apparatus of claim 1 wherein the input device comprises a tablet.

* * * * *